US011315538B2

(12) United States Patent
McKinley et al.

(10) Patent No.: US 11,315,538 B2
(45) Date of Patent: Apr. 26, 2022

(54) ANTI-RESONANT PANELS

(71) Applicant: The Boeing Company, Chicago, IL (US)

(72) Inventors: Shane G. McKinley, Everett, WA (US); Charles William Kirchner, Seattle, WA (US); Adam R Weston, Brier, WA (US); Josh Montgomery, Seattle, WA (US); Craig H. Emerson, Bothell, WA (US); Michael C. Messersmith, Everett, WA (US)

(73) Assignee: The Boeing Company, Chicago, IL (US)

( * ) Notice: Subject to any disclaimer, the term of this patent is extended or adjusted under 35 U.S.C. 154(b) by 363 days.

(21) Appl. No.: 16/676,701

(22) Filed: Nov. 7, 2019

(65) Prior Publication Data

US 2020/0074973 A1 Mar. 5, 2020

Related U.S. Application Data

(63) Continuation-in-part of application No. 15/840,902, filed on Dec. 13, 2017, now Pat. No. 11,056,092.

(51) Int. Cl.
*G10K 11/172* (2006.01)
*B32B 3/08* (2006.01)
(Continued)

(52) U.S. Cl.
CPC .......... *G10K 11/172* (2013.01); *B29C 64/153* (2017.08); *B32B 3/12* (2013.01);
(Continued)

(58) Field of Classification Search
CPC .... G10K 11/172; G10K 11/16; G10K 11/002; G10K 11/168; B29C 64/153; B32B 3/12;
(Continued)

(56) References Cited

U.S. PATENT DOCUMENTS 3,087,567 A 4/1963 Guenther
3,159,249 A * 12/1964 Lazan ...................... E04B 1/98
188/268
(Continued)

FOREIGN PATENT DOCUMENTS

CA 2625424 A1 * 9/2009 ............... B32B 3/18
CN 107103898 A 8/2017
(Continued)

OTHER PUBLICATIONS

Japanese Office Action; Application 18200803.7-1001; dated Nov. 24, 2020.
(Continued)

*Primary Examiner* — Edgardo San Martin
(74) *Attorney, Agent, or Firm* — Duft & Bornse, PC

(57) ABSTRACT

Noise insulation may be provided by an anti-resonant panel that includes a base panel including a base panel core material and two base panel face sheets, where each of the two base panel face sheets is adjacent to an opposite side of the base panel core material. The anti-resonant panel further includes at least one stiffener-member positioned along the base panel in a defined area of the base panel, where the defined area is less than a full area of the base panel. The stiffener-member includes a stiffener-member core having a top surface, a bottom surface in contact with the base panel, a plurality of cells having walls that extend from the top surface to the bottom surface, and a stiffener-member face sheet that is seamlessly integrated with the walls of the plurality of cells along the top surface.

20 Claims, 21 Drawing Sheets

(51) Int. Cl.
*B32B 3/12* (2006.01)
*B29C 64/153* (2017.01)
*B64C 1/40* (2006.01)
*B64C 1/12* (2006.01)
*G10K 11/168* (2006.01)
*B33Y 10/00* (2015.01)
*B33Y 80/00* (2015.01)

(52) U.S. Cl.
CPC .............. *B64C 1/40* (2013.01); *G10K 11/168* (2013.01); *B32B 2307/102* (2013.01); *B33Y 10/00* (2014.12); *B33Y 80/00* (2014.12)

(58) Field of Classification Search
CPC . B32B 3/08; B32B 2307/10; B32B 2307/102; B64C 1/40; B64C 1/12; B33Y 10/00; B33Y 80/00
See application file for complete search history.

(56) References Cited

U.S. PATENT DOCUMENTS

| | | | |
|---|---|---|---|
| 3,822,762 A | 7/1974 | Crispin et al. | |
| 4,778,028 A | 10/1988 | Staley | |
| 6,123,172 A * | 9/2000 | Byrd | D04H 1/02 181/290 |
| 6,377,695 B1 | 4/2002 | Azima et al. | |
| 6,971,475 B2 * | 12/2005 | Tompson | B29C 44/0461 181/204 |
| 7,070,848 B2 * | 7/2006 | Campbell | B60R 13/083 181/284 |
| 7,677,358 B2 * | 3/2010 | Tocchi | G10K 11/168 181/290 |
| 7,837,008 B1 * | 11/2010 | Lane | B64G 1/46 181/284 |
| 7,837,147 B2 * | 11/2010 | Liguore | B29C 70/088 244/119 |
| 8,066,097 B2 * | 11/2011 | Boyadjian | E04F 15/20 181/290 |
| 8,079,443 B2 | 12/2011 | Keller | |
| 8,336,804 B2 | 12/2012 | Hoetzeldt et al. | |
| 8,528,862 B2 * | 9/2013 | Liguore | B32B 37/12 244/119 |
| 8,627,922 B2 * | 1/2014 | Fournier | B32B 7/12 181/294 |
| 8,752,667 B2 | 6/2014 | McKnight et al. | |
| 8,770,343 B2 | 7/2014 | Mathur et al. | |
| 8,857,563 B1 | 10/2014 | Chang et al. | |
| 8,869,933 B1 | 10/2014 | McKnight et al. | |
| 8,881,864 B2 * | 11/2014 | Starling | B60R 13/0823 181/290 |
| 9,168,880 B2 * | 10/2015 | Adams | G10K 11/168 |
| 9,222,229 B1 | 12/2015 | Chang et al. | |
| 9,284,727 B2 | 3/2016 | McKnight et al. | |
| 9,353,518 B2 | 5/2016 | Mathur et al. | |
| 10,140,968 B2 * | 11/2018 | Ayres | B32B 3/266 |
| 11,056,092 B2 * | 7/2021 | Weston | B32B 27/12 |
| 2002/0046901 A1 | 4/2002 | Zapfe | |
| 2005/0217933 A1 * | 10/2005 | Sung Young | B60R 13/083 181/290 |
| 2006/0145004 A1 | 7/2006 | Drost et al. | |
| 2008/0099609 A1 | 5/2008 | Drost | |
| 2009/0183821 A1 * | 7/2009 | Schroeder | B32B 33/00 156/242 |
| 2009/0250292 A1 | 10/2009 | Hayasaka et al. | |
| 2009/0250293 A1 | 10/2009 | Gleine et al. | |
| 2011/0005188 A1 * | 1/2011 | Roger | B64D 33/02 60/39.093 |
| 2013/0087407 A1 | 4/2013 | McKnight et al. | |
| 2014/0000980 A1 * | 1/2014 | Carson | G10K 11/002 181/290 |
| 2014/0008146 A1 * | 1/2014 | Fuhrmann | G10K 11/002 181/294 |
| 2014/0299409 A1 | 10/2014 | Mathur et al. | |
| 2014/0326536 A1 | 11/2014 | Vauchel et al. | |
| 2015/0090524 A1 * | 4/2015 | Leretour | B29D 99/0021 181/284 |
| 2016/0046095 A1 | 2/2016 | Clough et al. | |
| 2017/0069304 A1 | 3/2017 | Seto et al. | |
| 2020/0339243 A1 * | 10/2020 | Bouillon | B64D 33/06 |

FOREIGN PATENT DOCUMENTS

| | | | | |
|---|---|---|---|---|
| CN | 113103689 A | * | 7/2021 | |
| EP | 2365483 A1 | | 9/2011 | |
| GB | 2452476 A | * | 3/2009 | ............. B22F 7/004 |
| JP | 2001233249 A | | 8/2001 | |
| JP | 2002129671 A | | 5/2002 | |
| JP | 2017210867 A | | 11/2017 | |

OTHER PUBLICATIONS

European office action; Application 18200803.7; dated Sep. 30, 2021.

* cited by examiner

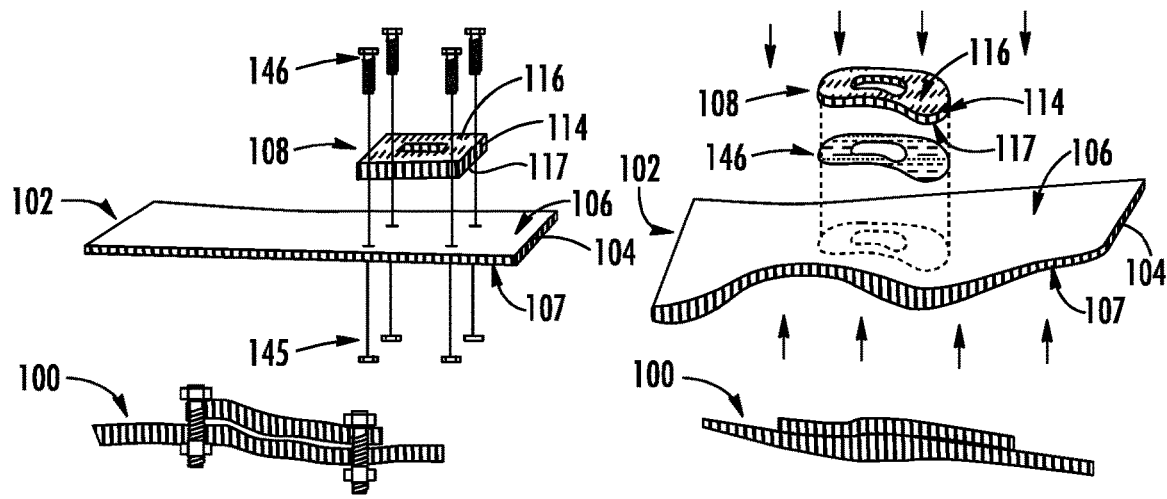
FIG. 5A
FIG. 5B
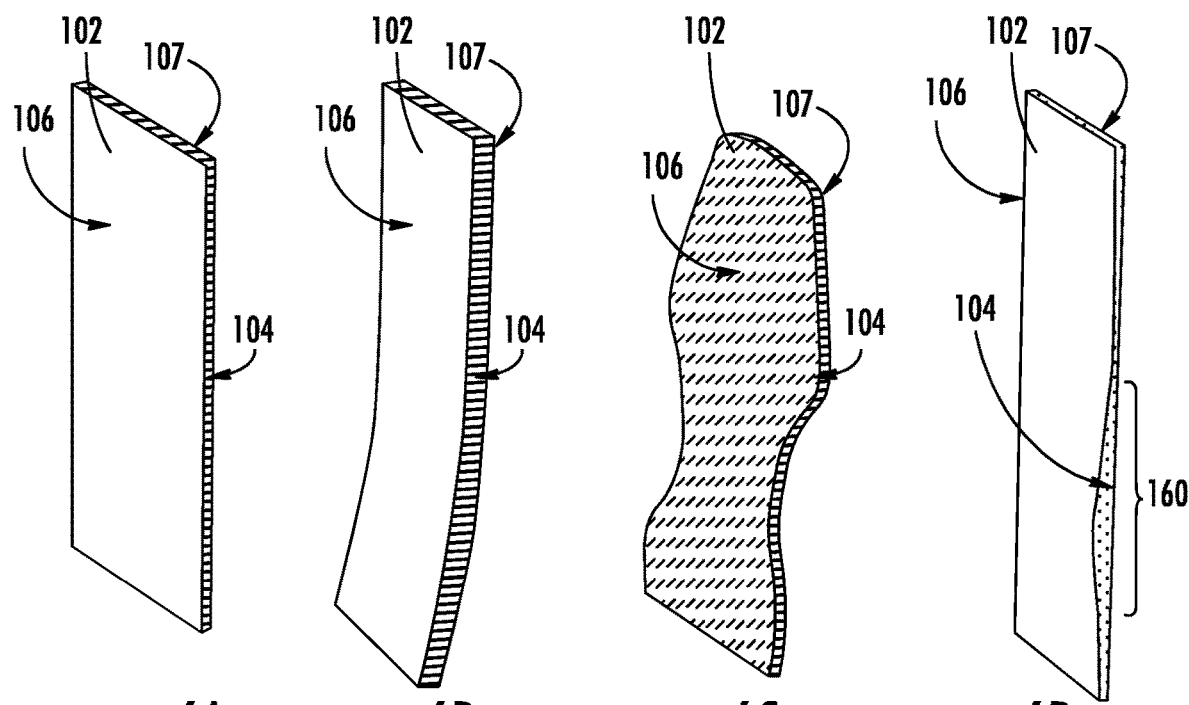
FIG. 6A
FIG. 6B
FIG. 6C
FIG. 6D

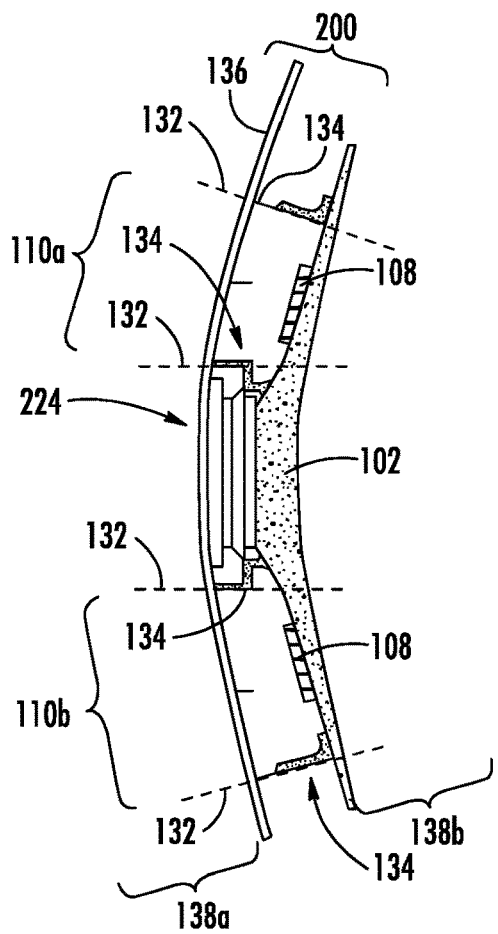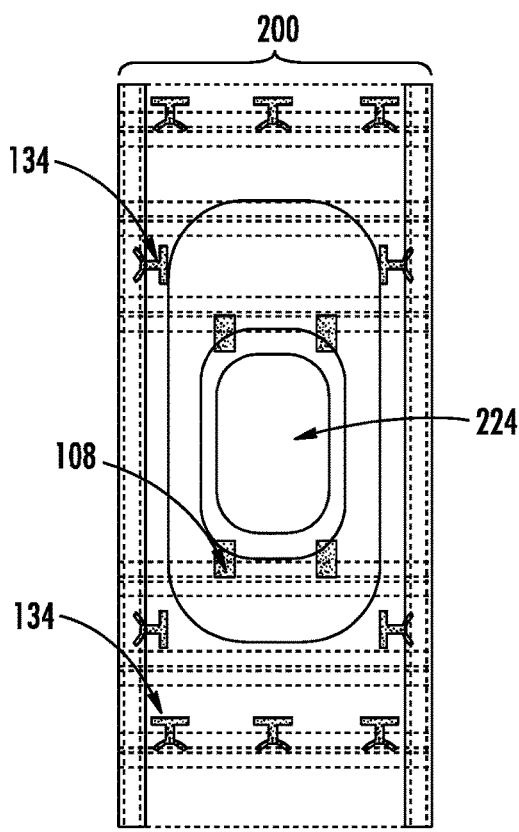
FIG. 10A    FIG. 10B
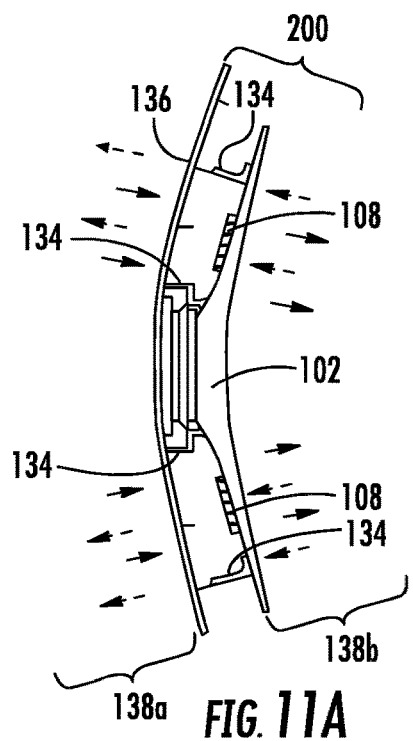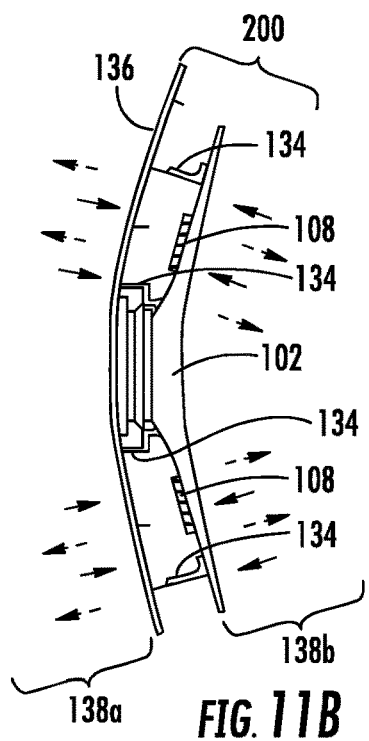
FIG. 11A    FIG. 11B

ANTI-RESONANT PANELS

RELATED APPLICATIONS

This patent application is a continuation-in-part of co-pending U.S. patent application Ser. No. 15/840,902, filed on Dec. 13, 2017 and having the title of "AN ANTI-RESONANT PANEL AND METHODS OF MAKING THE SAME", which is hereby incorporated by reference in its entirety.

TECHNOLOGICAL FIELD

Example embodiments of the present disclosure relate generally to noise insulating materials and, more particularly, to methods and systems providing noise insulation using a panel.

BACKGROUND

Current technologies in noise insulation use passive noise control approaches such as sound absorbers, dampers, or blockers. These components are usually either too large or too heavy, making the approaches either inefficient for noise control or ineffective for low frequency noise control. Active noise control provides another noise control option. However, active noise control requires wiring and power, which can make active noise control complex, costly, and/or difficult to implement for noise control in applications where large surface areas are present, such as in motor vehicles, boats, or an aircraft (e.g., "acreage noise control").

SUMMARY

Noise-insulating panels are provided herein. The noise-insulating panel may be an anti-resonant panel comprising a base panel and at least one stiffener-member positioned along the base panel in a defined area of the base panel, where the defined area is less than a full area of the base panel. The stiffener-member comprises a continuous structure that includes a honeycomb core and a face sheet seamlessly integrated with the honeycomb core. The stiffener-member is configured to provide anti-resonant performance to the base panel by adding stiffness to the defined area of the base panel at a low mass density.

One embodiment described herein comprises an anti-resonant panel including a base panel and at least one stiffener-member. The base panel includes a base panel core material and two base panel face sheets, where each of the two base panel face sheets are adjacent to an opposite side of the base panel core material. The at least one stiffener-member is positioned along the base panel in a defined area of the base panel, where the defined area is less than a full area of the base panel. The at least one stiffener-member comprises a stiffener-member core having a top surface, a bottom surface in contact with the base panel, a plurality of cells having walls that extend from the top surface to the bottom surface, and a stiffener-member face sheet that is seamlessly integrated with the walls of the plurality of cells along the top surface.

In an embodiment of the anti-resonant panel, the at least one stiffener-member provides anti-resonant performance to the base panel by adding stiffness to the defined area of the base panel at a low mass density.

In an embodiment of the anti-resonant panel, the at least one stiffener-member comprises two or more stiffener-members, each positioned along the base panel in respective defined areas of the base panel.

In an embodiment of the anti-resonant panel, the stiffener-member core and the stiffener-member face sheet comprises Nylon.

In an embodiment of the anti-resonant panel, the cells comprise hexagonal cells.

In an embodiment of the anti-resonant panel, the stiffener-member core includes a perimeter wall extending from the top surface to the bottom surface that surrounds the plurality of cells and is seamlessly integrated with the walls of the cells that are in contact with the perimeter wall.

In an embodiment of the anti-resonant panel, the anti-resonant panel reduces noise propagation through the anti-resonant panel at frequencies between 300 Hertz to 1000 Hertz.

In an embodiment of the anti-resonant panel, the bottom surface of the at least one stiffener-member is bonded to the base panel utilizing an adhesive.

Another embodiment described herein comprises a method making an anti-resonant panel having a base panel with a base panel core material and two base panel face sheets, where each of the two base panel face sheets adjacent to an opposite side of the base panel core material. The method comprises attaching at least one stiffener-member along the base panel in a defined area of the base panel, where the defined area less than a full area of the base panel, and the at least one stiffener-member includes a stiffener-member core having a top surface, a bottom surface in contact with the base panel, a plurality of cells having walls that extend from the top surface to the bottom surface, and a stiffener-member face sheet that is seamlessly integrated with the walls of the plurality of cells along the top surface.

In an embodiment of the method, the at least one stiffener-member provides anti-resonant performance to the base panel by adding stiffness to the defined area of the base panel at a low mass density.

In an embodiment of the method, attaching the at least one stiffener-member comprises attaching two or more stiffener-members, each positioned along the base panel in respective defined areas of the base panel.

In an embodiment of the method, the cells comprise hexagonal cells.

In an embodiment of the method, the stiffener-member core includes a perimeter wall extending from the top surface to the bottom surface that surrounds the plurality of cells and is seamlessly integrated with the walls of the cells that are in contact with the perimeter wall.

In an embodiment of the method, the anti-resonant panel reduces noise propagation through the anti-resonant panel at frequencies between 300 Hertz to 1000 Hertz.

In an embodiment of the method, attaching the at least one stiffener-member comprises bonding the bottom surface of the at least one stiffener-member to the base panel utilizing an adhesive.

Another embodiment described herein comprises a method making an anti-resonant panel having a base panel with a base panel core material and two base panel face sheets, where each of the two base panel face sheets adjacent to an opposite side of the base panel core material. The method comprises additively forming, using a first series of manufacturing steps, a stiffener-member core having a top surface, a bottom surface, and a plurality of cells having walls that extend from the top surface to the bottom surface. The method further comprises additively forming, using a second series of the manufacturing steps, a stiffener-member face sheet on the top surface of the stiffener-member core.

The method further comprises attaching the bottom surface of the stiffener-member core to a defined area of the base panel, wherein the defined area of the base panel is less than a full area of the base panel.

In an embodiment of the method, the manufacturing steps comprise Selective Laser Sintering (SLS).

In an embodiment of the method, the stiffener-member core and the stiffener-member face sheet comprise Nylon.

In an embodiment of the method, the cells comprise hexagonal cells.

In an embodiment of the method, the method further comprises additively forming, using the first series of manufacturing steps, a perimeter wall extending from the top surface to the bottom surface that surrounds the plurality of cells and is seamlessly integrated with the walls of the cells that are in contact with the perimeter wall.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale:

FIGS. 5A and 5B illustrate exemplary methods of attaching stiffener-members to base panels in accordance with some example embodiments described herein;

FIGS. 6A-6D illustrate exemplary base panels that make up the foundation of exemplary anti-resonant panels in accordance with some example embodiments described herein;

FIGS. 10A and 10B illustrate the addition of exemplary grounding members to anti-resonant panels in accordance with some example embodiments described herein;

FIGS. 11A and 11B illustrate the double pane effect seen in exemplary anti-resonant panels in accordance with some example embodiments described herein;

DETAILED DESCRIPTION

Figure 1A:
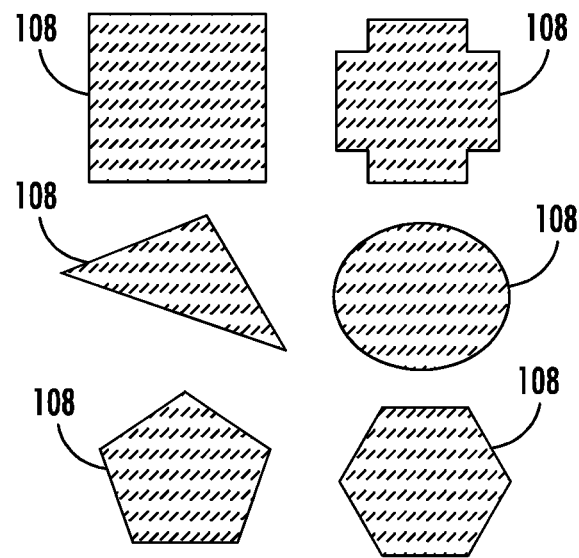
FIGS. 1A and 1B illustrate exemplary stiffener-members for anti-resonant panels in accordance with some example embodiments described herein.

In general, embodiments of the present disclosure provided herein include methods and systems for providing noise insulation, particularly noise control for low frequencies. More specifically, noise insulation is provided by using an anti-resonance approach. Some embodiments of the present disclosure will now be described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, "anti-resonant performance" refers to the sound transmission loss resulting from reduction of structural net vibratory displacement. In certain embodiments described herein, this reduction of structural net vibratory displacement is generally obtained by reflecting the impacting sound waves off of the component. Such reflection may be obtained with the disclosed materials. For example, the addition of a stiffener-member as described herein to a base panel as described herein may provide anti-resonant performance to the panel making the panel an anti-resonant panel.

The term "mass density" refers to the amount of matter per volume.

The term "hollowed portion" refers to a hole or vacancy of material in a defined area of the respective component such that the hollowed portion lacks the material otherwise continuous in the component. The hollowed portion may be created by removing an interior portion of the component and be defined by an inner wall of the component. As used herein, "defined area" is generally in reference to anti-resonant units or portions of the anti-resonant panel. That is, the anti-resonant panel may be divided into defined areas or portions. Stiffener-members may cover all or part of the defined areas. Additional components such as inertial members may be added to the defined areas and reinforcing members and/or grounding members may be added to defined areas, particularly along the perimeter forming the defined areas.

As used herein, "acoustic boundary" refers to a limit, generally imposed by a physical component, creating a defined acoustic transmission path where sound travels differently (with regards to speed, path, transmission efficiency etc.) compared to the adjoining space. As used herein, various components may be incorporated into the anti-resonant panels to create acoustic boundaries allowing for more control of noise propagation when contacting the panel. The acoustic boundaries may be in line with the perimeter of the defined area.

Overview

Provided herein are systems, devices, panels, and methods for providing noise control, in particular by reflecting and/or blocking noise. Noise insulation may be provided, for example, by noise insulating panels that include stiffener-members that impart anti-resonance to the panel, which are then referred to as anti-resonant panels. The resulting anti-resonant panels may reduce the external acoustic energy passing through the panel, thereby providing improved noise insulation. The anti-resonant panels include a base panel and stiffener-members distributed along the base panel. The anti-resonant panel may enable anti-resonance frequencies with locally out-of-phase vibration modes to passively neutralize the sound radiation through the panel and into any enclosed structure. In conventional enclosed structures, such as aircraft cabins, cars, boats, etc., the complex geometry, large dimension, and existing attached components, such as windows, may impose significant challenges in structural vibration management for noise control. However, the anti-resonant design of the base panels combined with the stiffener-members may allow for acreage noise control for such enclosed structures. The lightweight nature and high bending stiffness of the anti-resonant panels may provide anti-resonant based noise control or anti-resonant performance. The anti-resonant panels may achieve high sound transmission loss over a wide frequency range, particularly in the low frequency regime of hundreds to a thousand Hertz (Hz), outperforming conventional added-mass and damping approaches in the same frequency range. Benefiting from existing components, such as attached windows or nearby frames, inertial members may be incorporated into the anti-resonant panels to further tune the anti-resonant design.

The anti-resonant panels may also improve double-leaf noise insulation by interacting with nearby structures, such as the fuselage skin of an aircraft. The anti-resonant panels may provide a lightweight, compact, practical, and economic solution to providing targeted noise control to structures, such as aircraft cabins and other enclosed structures where noise control is of concern. The anti-resonant panels may be particularly beneficial for areas where contoured panels are needed, as such were previously difficult to control acoustically. The anti-resonant panels, with the distinct stiffener-members distributed along the base panels in defined areas, may be able to conform to the desired shape while still achieving the anti-resonant performance of the anti-resonant panels. In some embodiments, the anti-resonant panels may provide lightweight noise blocking barriers for structures such as aircraft cabins and improve upon existing panels (e.g., trim panels of boats, vehicles, or aircraft) particularly those of large dimension (e.g., acreage noise control) with conformal as well as asymmetric geometry and may work with other components of the structure, such as cabin windows, to control noise propagation.

The anti-resonant panels may replace simple to complex panels. As compared to existing noise-insulating panels, the anti-resonant panels may have reduced manufacturing costs with simpler manufacturing techniques, enable stiffness control, and generally provide a panel with reduced mass compared to existing noise-insulating panels. In particular, previous technologies use passive noise control approaches such as sound absorbers, dampers, or blockers. These components are usually either too large or too heavy, especially for low frequency noise control. Active noise control may provide another noise control option. However, active noise control typically requires wiring and power requirements making the option complex, costly, and hard to implement for acreage noise control applications.

Indeed, there has been a long-felt need for lightweight acoustic attenuation, particularly inside enclosed cabins (e.g., cabins in cars, aircraft, boats, trains, etc.). State of the art noise control used for vehicular trim panel routinely involves recycled noise control mechanisms, such as Helmholtz-style absorption, constrained layer damping, mass-loading, fibrous-type batting for acoustic absorption, or combinations thereof. Generally speaking, noise above 1000 Hz may be dealt with using these approaches. However, there exists a need for lightweight noise control in the lower-frequency range, e.g., below 1000 Hz.

Trim panels used in vehicles requiring lightweight design typically include a sandwich-type design, which enables a relatively durable boundary wall that forms the interior walls of the enclosed cabin, yet offers a relatively lightweight solution. Such panels and any panel that is lightweight, relatively stiff, and relatively large in area makes for a sound radiator. These trim panels also make up much of the interior surface of the vehicle, which make the trim panels a prime influence on the acoustic properties inside the vehicle. These trim panels can produce global vibratory modes that dominate the noise frequency range, especially below 1000 Hz, and have been difficult to mitigate without mass loading the trim panels, which, if implemented, results in a significant mass penalty and corresponding decreased fuel efficiency.

Provided herein is a passive noise control technology with advantages of lightweight, compactness, high noise reduction, and environmental robustness. The anti-resonant panels provide a conformal sound insulating panel with high noise reduction that may provide a lightweight noise control solution for high quality travelling experience. For instance, the anti-resonant panels can be used as trim panels in an aircraft cabin, as partitions, bulkhead, sidewalls, and floors for various airplane models, to reduce noise propagation into and between chambers. In addition, the anti-resonant panels may be used as, for example, housings or partitions, in various commercial products that contain noisy components (e.g., motors, pumps, compressors, transmissions, transformers, ducts, etc.) including appliances, grinders, blenders, microwave ovens, sump pumps, etc. The anti-resonant panels may be suitable for a variety of applications, such as any application where noise control is desired, without deviating from the intent of the present disclosure.

The anti-resonant panels may employ a sound-reflection mechanism, using anti-resonance to reflect a tuned bandwidth of sound energy from the panel. The disclosed mechanism may involve a slight mass penalty as compared to unmodified panels, although the mass penalty involved may be significantly less than what would otherwise be used to create similar transmission loss performance based on mass law predictions. The anti-resonant panels' transmission loss performance may extend beyond the panel's predicted mass-law sound-attenuation limit within the low frequency range of interest by modifying the global panel vibratory modes. In some embodiments, other components, such as one or more inertial members, grounding members, and reinforcing members may be added to modify the global panel vibratory modes.

The anti-resonant panel may be particularly effective in the low frequency range (e.g., about 300 Hz to about 1000 Hz) without adding a significant amount of mass. The anti-resonant bandwidth may be tailored to meet a target range of problem noise frequencies associated with the unmodified base panel as disclosed herein. Furthermore, current engineered trim panel designs are inherently complex in shape, as architectural designs and features are desired in most passenger aircraft and vehicles. Such complexity can make the implementation of an anti-resonant design difficult. Provided herein are panels with anti-resonant performance using a diverse range of panel materials, shapes, sizes, and orientations to enhance the versatility of the panels for use in various applications. The noise control mechanism may have an added benefit of being relatively unaffected by temperature, humidity, and pressure changes, which further makes the panels suitable for vehicles that routinely experience fluctuations in environmental conditions, such as aircraft, trains, and automobiles.

The anti-resonant panels may improve upon existing tunable sandwich-structured acoustic barriers by implementing anti-resonance control, particularly for geometrically complex panels with asymmetric geometry and of a large dimension. Further, the anti-resonant panels may enhance double-pane soundproofing in terms of wide bandwidth and noise reduction by interacting with nearby panels.

In some embodiments, pre-qualified materials may be used for the anti-resonant panels to create a noise control or acoustic blocking structure over an acreage area for noise management.

Having described example embodiments at a high level, the design of the various configurations performing various example operations is provided below.

Provided herein are anti-resonant panels with anti-resonance sound blocking performance to provide noise insulation. In some embodiments, the technology may be passive in nature, not relying on electronics or actuation for the sound blocking performance. The anti-resonant panels may include sandwich-type base panels, which are lightweight and stiff; can be manufactured in various sizes, thickness, and materials, such as pre-qualified aviation materials; and can be mounted in various ways. The anti-resonant panels also include a stiffener-member with the base panel. Without intending to be bound by theory, the stiffener-member provides localized stiffness to specific areas ("defined areas") of the base panel resulting in anti-resonant performance of the resulting panel.

The anti-resonant panels may have the capability to block low frequency sound and may use preexisting composite materials that may already be fully qualified for use in vehicles, such as aircraft. The mechanical properties of the anti-resonant panels may provide improved sound blocking performance for noise insulation. The anti-resonant panels may be used in any application where lightweight, strong paneling is desired, such as fuel-efficient vehicles and the like.

Figure 1B:
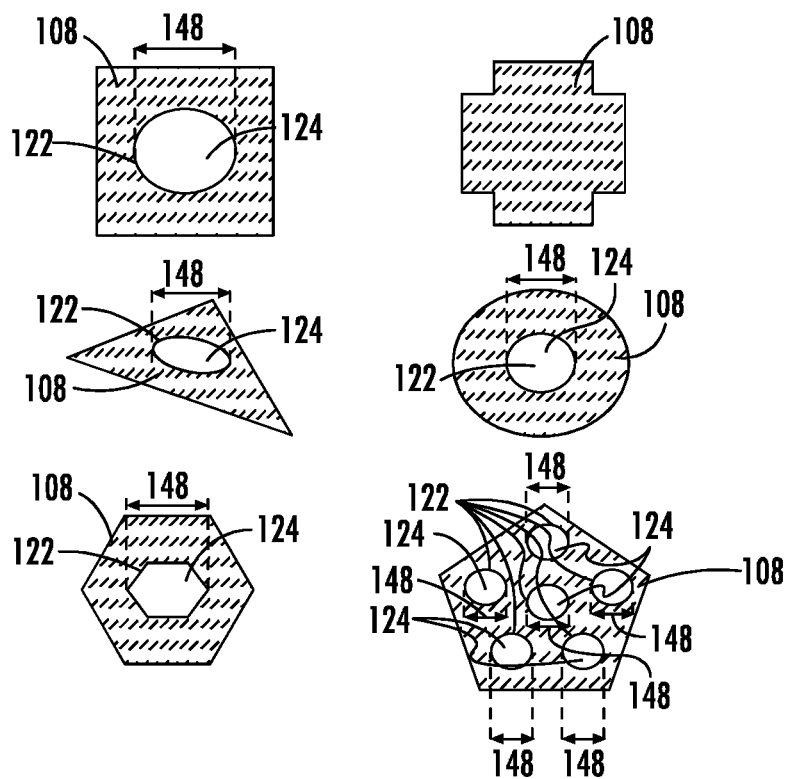

FIG. 1A illustrates exemplary shapes for stiffener-members 108. FIG. 1B illustrates additional exemplary shapes for stiffener-members 108. The stiffener-members 108 may include hollowed portions 124, such as shown in FIG. 1B, such that the stiffness and surface density of the final design of the stiffener-member 108 are altered, ultimately altering the stiffness-to-mass ratio of the stiffener-member 108. The stiffener-member 108 may include an interior wall 122 defining a hollowed portion 124 in the stiffener-member 108. The hollowed portions 124 may cut vertically through the stiffener-member 108 (e.g., through each of the stiffener-member core material 114 and stiffener-member face sheets 116, 117 of the stiffener-member 108 (shown in FIGS. 2A-2G)). Such hollowing of the stiffener-members 108 may reduce the mass of the stiffener members 108 without significantly reducing the stiffness of the stiffener members 108. That is, the stiffener members 108 are still stiff enough to manipulate the dynamics of the anti-resonant panels 100 while not adding significant mass to the anti-resonant panels 100. Variations on this manipulation of the stiffener-members 108 may be used to obtain the desired anti-resonant performance.

FIGS. 2A-2G provide various exemplary configurations of stiffener-members 108 on base panels 102. To provide the anti-resonance effect, one or more stiffener-members 108 can be used with the base panel 102. The stiffener-members 108 control the global vibratory modes and enable the anti-resonant design. Stiffener-members 108 can encompass any shape, number, orientation, or location as needed to enable anti-resonant performance of the resulting anti-resonant panels 100. For example, in some embodiments, the stiffener-members 108 may be about 10% to about 30% of the total mass of the anti-resonant panel 100, such as about 15% to about 25% of the total mass of the anti-resonant panel 100, such as about 20% or less of the total mass of the anti-resonant panel 100.

The stiffener-members 108 may cover less than 40% of the total surface area of the anti-resonant panel 100 (e.g., less than 40% of the total surface area of the side of the anti-resonant panel 100 on which the stiffener-member(s) 108 are placed), such as less than 35% of the total surface area of the anti-resonant panel 100 (e.g., less than 35% of the total surface area of the side of the anti-resonant panel 100 on which the stiffener-member(s) 108 are placed), such as less than 30% of the total surface area of the anti-resonant panel 100 (e.g., less than 30% of the total surface area of the side of the anti-resonant panel 100 on which the stiffener-member(s) 108 are placed), such as less than 25% of the total surface area of the anti-resonant panel 100 (e.g., less than 25% of the total surface area of the side of the anti-resonant panel 100 on which the stiffener-member(s) 108 are placed), such as less than 20% of the total surface area of the anti-resonant panel 100 (e.g., less than 20% of the total surface area of the side of the anti-resonant panel 100 on which the stiffener-member(s) 108 are placed). In some embodiments, the stiffener-member 108 may be disposed along less than 25% of a total surface area of the base panel 102 and a mass of the stiffener-member 108 may be about 20% or less of a total mass of the anti-resonant panel 100. With such low coverage of the total surface area of the base panel 102 (e.g., less than 40% of the total surface area of the anti-resonant panel 100) and low mass addition to the total mass of the anti-resonant panel 100 (e.g., less than 30% of the total mass of the anti-resonant panel 100), the stiffener-member 108 is able to increase the stiffness of the base panel 102 without significantly impacting the mass of the base panel 102 and provide control of the anti-resonant performance due to the discrete nature of the stiffener-members 108. The density and thickness of the stiffener-members 108 may vary based on the desired anti-resonant performance. The stiffener-members 108 will generally have a low mass density and high stiffness.

The various configurations presented in FIGS. 2A-2G are a few examples of configurations that may alter the stiffness and mass-density properties of the resulting anti-resonant panel 100. The stiffener-members 108 of the present disclosure are not limited to those shown in FIGS. 2A-2G and may include a variety of materials in a variety of configurations without deviating from the intent and scope of the present disclosure. For instance, the stiffener-members 108 can be a combination of the following materials and/or other materials and designs that provide the desired lightweight but stiff combination and impart an acoustic boundary 132 to the base panel 102. For instance, the stiffener-member face sheets 116, 117 may be lightweight, strong material such as carbon fiber, fiberglass, or combinations thereof. The stiffener-member core material 114 may comprise foam (e.g., polyethylene terephthalate (PET) foam), be of a honeycomb construction (e.g., aramid honeycomb construction), otherwise have a porous structure, or combinations thereof. In some embodiments, the stiffener-member core material 114 may comprise PET foam, aramid honeycomb construction, or combinations thereof.

The stiffener-member face sheets 116, 117 may comprise carbon-fiber, fiberglass, combinations thereof, or other similar materials. In some embodiments, the stiffener-member face sheets 116, 117 may comprise carbon fiber, fiberglass, a fiber composite, or combinations thereof. Metal (e.g., aluminum) struts, trusses, or porous structures may be used to impart stiffness while not significantly increasing mass. Two different stiffener-member core materials 114 are shown in FIGS. 2A-2G. As the stiffener-members 108 are discrete, concentrated areas along the base panel 102, the materials may have a higher modulus than materials that would typically be used for construction of a base panel 102. In addition, materials that may be of a flammability concern in large areas, may be used in the stiffener-members 108 as such are generally smaller, more concentrated, discrete areas along the base panel 102 rather than the full length/width of the base panel 102.

Figure 2A:
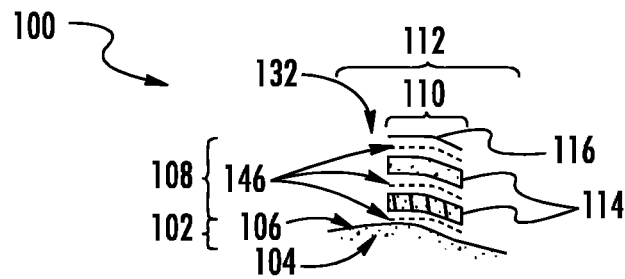
FIGS. 2A-2G illustrate exemplary configurations of stiffener-members in anti-resonant panels in accordance with some example embodiments described herein.
Figure 2B:
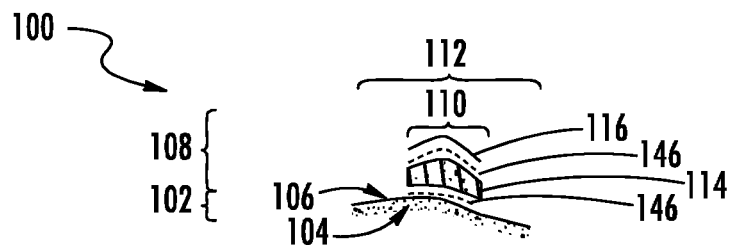
Figure 2C:
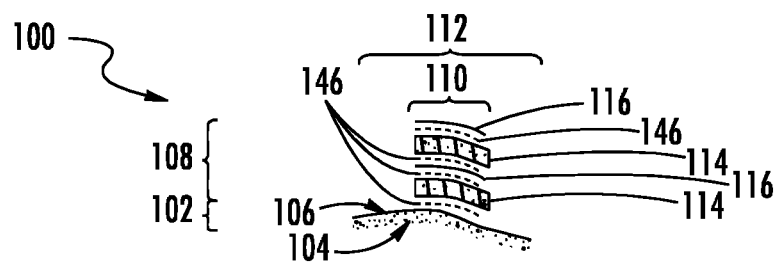
Figure 2D:
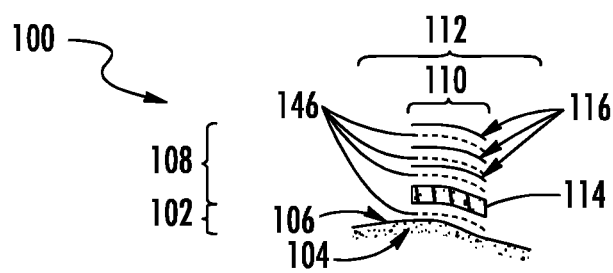
Figure 2E:
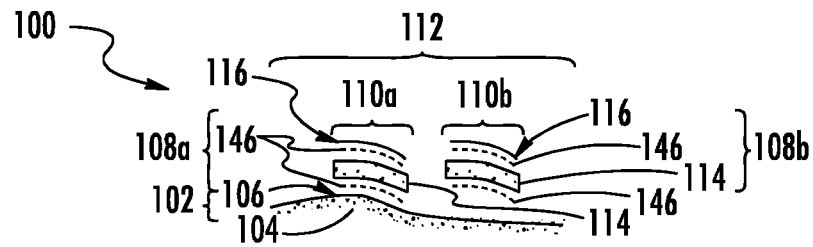

As shown in FIGS. 2A-2G, multiple stiffener-member face sheets 116 and/or 117 may be used to form the stiffener-member 108 and/or multiple stiffener-member core materials 114 may be used to form the stiffener-member 108. In some embodiments, multiple stiffener-members 108 may be disposed on a base panel 102. For instance, the anti-resonant panel 100 of FIG. 2E includes a first stiffener-member 108a and a second stiffener-member 108b, each in respective defined areas 110a, 110b on the base panel 102. The first and second stiffener-members 108a, 108b are shown in FIG. 2E as having the same compositions, however, the compositions of the first and second stiffener-members 108a, 108b may be the same or different and more than two stiffener-members 108 may be incorporated on/into the base panel 102. Variations on the number and combination of these materials may be used to achieve the desired anti-resonant performance.

Figure 2F:
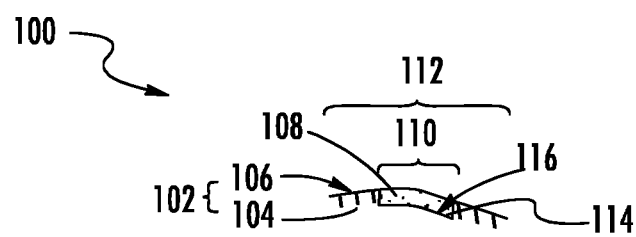
Figure 2G:
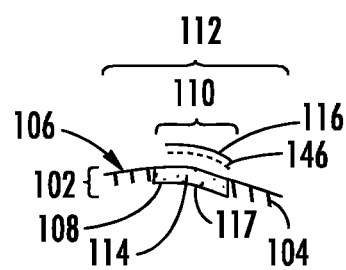

In some embodiments, the anti-resonant panels 100 may include stiffener-members 108 disposed on one of the two base panel face sheets 106, 107. In some embodiments, the anti-resonant panels 100 may include stiffener-members 108 disposed between the two base panel face sheets 106, 107 and adjacent to the base panel core material 104. FIGS. 2A-2E illustrate stiffener-members 108 applied to the base panel face sheets 106, 107 while FIGS. 2F and 2G illustrate stiffener-members 108 applied to the interior of the base panel 102 and covered by the base panel face sheets 106, 107. In particular, in FIGS. 2F and 2G, the stiffener-members 108 replace a portion of the base panel core material 104. As shown in FIG. 2G, a first stiffener-member face sheet 116 may be applied externally to the base panel face sheet 106 using an adhesive (attachment mechanism 146). Such placement of the stiffener-member face sheet 116 may further increase the bending stiffness of the defined area 110 in which the stiffener-member 108 is disposed.

When being applied to the interior of the base panel 102, the stiffener-member 108 may include stiffener-member core material 114 and one or more stiffener-member face sheets 116, 117 or simply stiffener-member core material 114 without one or more stiffener-member face sheets 116, 117. Stiffener-member face sheets 116, 117 may be applied to the interior of the base panel 102 (e.g., under one or more base panel face sheets 106, 107 (shown in FIGS. 6A-6D)) and/or applied to the exterior of the base panel 102 (e.g., over one or more base panel face sheets 106, 107).

The stiffener-members 108 may be designed to provide the desired degree of anti-resonant performance by including the stiffener-members 108 in specific regions (e.g., defined areas 110) of base panels 102 and with specific constructions. That is, the materials, size, shape, and configuration of materials for the stiffener-members 108 may be modified to achieve the desired anti-resonance behavior. In some embodiments, the anti-resonant panel 100 may include two or more stiffener-members 108 (e.g., first and second stiffener-members 108a and 108b as shown in FIG. 2E) each positioned along the base panel 102 in respective defined areas 110 (e.g., first and second defined areas 110a and 110b as shown in FIG. 2E) of the base panel 102.

Without intending to be limited by theory, the stiffener-member 108 may provide an efficient acoustic boundary on the base panel 102 thereby enabling alteration of the global vibratory modes of the anti-resonant panel 100 (that is, the vibratory modes of the whole base panel 102 such as the first and second principal modes and the anti-resonant mode in between). In some embodiments, the stiffener-member 108 may have a sandwich-type construction (e.g., comprising two stiffener-member face sheets 116, 117 surrounding a stiffener-member core material 114 on opposite sides of the core material 114), which may enable lightweight but high bending stiffness resulting in a sandwich-type stiffener member 108. Various other stiffener-member 108 configurations with high stiffness-to-mass ratio are discussed herein. The high stiffness-to-mass ratio may allow for anti-resonant performance while also allowing for high fuel efficiency when applied to vehicles. In some embodiments, the anti-resonant panel 100 may be configured to reduce noise propagation through the anti-resonant panel 100 at frequencies between about 300 Hz to about 1000 Hz. For instance, the anti-resonant panel 100 may include a stiffener-member 108 (e.g., stiffener-member 108 in FIGS. 1A-1B, 2A-2G, 4A-4C, and 5A-5B) on a base panel 102 (e.g., base panel 102 in FIGS. 2A-2G, 4A-4C, 5A-5B, and 6A-6D) that may reduce noise propagation through the anti-resonant panel 100 at low frequencies (e.g., about 300 Hz to about 1000 Hz), which are typically difficult to reduce or control with base panels alone.

In some embodiments, one or more stiffener-members 108 may be added to one or more base panels 102, in particular to one or more base panel face sheets 106, 107 to alter the stiffness-to-mass ratio of the base panel 102. The anti-resonant panels 100 include a base panel 102 comprising a base panel core material 104 and two base panel face sheets 106, 107, each of the two base panel face sheets 106, 107 adjacent to an opposite side of the base panel core material 104; and at least one stiffener-member 108 positioned along the base panel 102 in a defined area 110 of the base panel 102, the defined area 110 being less than a full area 112 of the base panel 102; wherein the stiffener-member 108 comprises a stiffener-member core material 114 and two stiffener-member face sheets 116, 117, each of the two stiffener-member face sheets 116, 117 adjacent to an opposite side of the stiffener-member core material 114, and wherein the stiffener-member 108 is configured to provide anti-resonant performance to the base panel 102. The stiffener-member 108 may be configured to provide anti-resonant performance to the base panel 102 by adding stiffness to the defined area 110 of the base panel 102 at a low mass density.

For instance, as shown in FIGS. 2A-2G, 3, 4A-4C, the stiffener-member 108 may provide stiffness by being constructed as a sandwich-type stiffener-member comprising at least one stiffener-member face sheet 116, 117 and a stiffener-member core material 114 and being prepared with materials described herein. In some embodiments, the stiffener-member 108 may add stiffness at a low mass density by including a hollowed portion 124 as shown in FIG. 1B and/or be disposed on the base panel as shown in FIG. 5A-5b or 4A-4C. The one or more stiffener-members 108 are disposed on the exterior surface of the one or more base panel face sheets 106, 107. In some embodiments, one or more stiffener-members 108 may be added to the interior base panel core material 104 and then surrounded by the base panel face sheets 106, 107. The one or more stiffener-members 108 may be applied to the base panel core material 104 and/or used in place of the base panel core material 104 in defined areas 110 of the base panel 102. One or more stiffener-members 108 may be added to defined areas 110 of the base panel 102 to alter the stiffness-to-mass ratio of the base panel 102 at specific points along the base panel 102. Various stiffener-member face sheets 116, 117, adhesive films or adhesive materials (collectively referred to as "attachment mechanisms" 146), and stiffener-member core materials 114 can be used to form the stiffener-members 108 and achieve the desired stiffness and specific mass properties of the final stiffener-member 108 and the resulting anti-resonant panel 100.

The configurations described in FIGS. 1A-1B and 2A-2G are examples of embodiments that can effectively be used as stiffener-members 108 for anti-resonant performance. Combinations of these examples as well as other configurations of the stiffener-members 108 may be used in conjunction with the base panels 102 to provide anti-resonant panels 100 with the improved anti-resonant performance.

Figure 3:
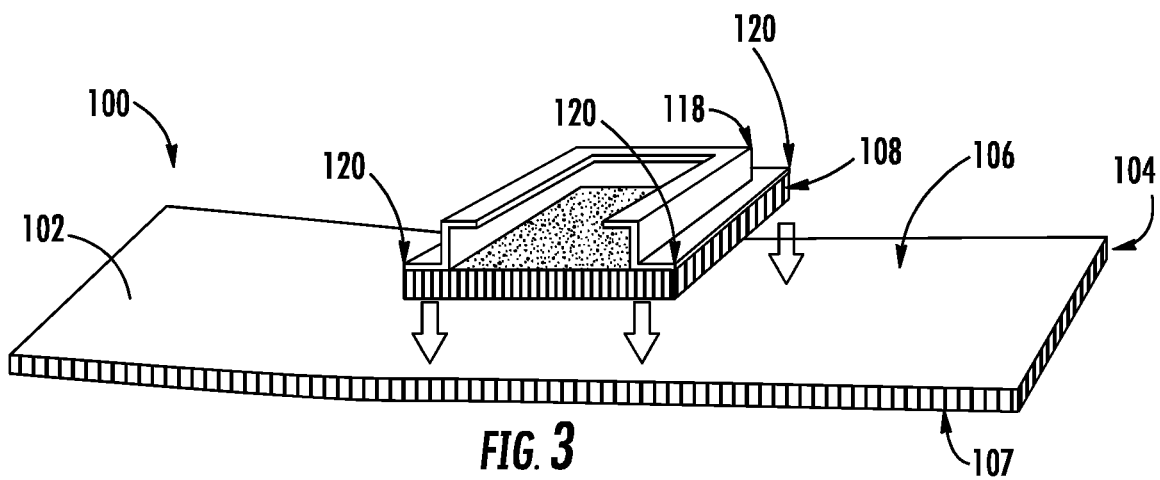
FIG. 3 illustrates a perimeter-type stiffener-member enhancing a sandwich-type stiffener-member in accordance with some example embodiments described herein.

In some embodiments, as shown in FIG. 3, stiffener-members 108 can include a perimeter-type stiffener-member 118 that is lightweight and further increases the stiffness of the anti-resonant panel 100. The anti-resonant panel 100 may include a perimeter-type stiffener-member 118 disposed along one or more edges 120 of the stiffener-member 108. For instance, in some embodiments, perimeter-type stiffener-members 118 may be included to reinforce a stiffener-member 108, such as a sandwich-type stiffener-member 108 (see e.g., FIG. 3), or may be used alone as the stiffener-member 108. The perimeter-type stiffener member 118 is particularly effective in performance when disposed along the perimeter of a sandwich-type stiffener-member 108 to further improve the anti-resonant performance of the anti-resonant panel 100. For instance, FIG. 3 shows a lightweight perimeter-type stiffener member 118 enhancing the sandwich-type stiffener-member 108, which then engages to a sandwich-type base panel 102.

As shown in FIG. 3, the perimeter-type stiffener member 118 may be have a Z-shaped cross-section (e.g., two parallel horizontal portions are connected by a vertical portion, the two parallel horizontal portions independently connected to the vertical portion at opposite ends of the horizontal portions, forming a Z-shaped cross section) and extend along one or more sides or edges 120 of the sandwich-type stiffener-member 108. For instance, in the embodiment illustrated in FIG. 3, the perimeter-type stiffener member 118 traces the perimeter of the sandwich-type stiffener-member 108 along three edges 120 of the sandwich-type stiffener-member 108. However, the perimeter-type stiffener member 118 may trace one, two, or all edges 120 of a sandwich-type stiffener-member 108. The stiffness of the anti-resonant panel 100 is particularly increased when the perimeter-type stiffener member 118 connects three or more edges 120 enclosing a perimeter as shown in FIG. 3. The perimeter-type stiffener member 118 may have a cross-section that is I-shaped (e.g., two parallel horizontal portions are connected by a vertical portion, the two parallel horizontal portions centered on top and on the bottom of the vertical portion, forming an I-shaped cross-section), L-shaped (e.g., a single horizontal portion is attached on the bottom of a single vertical portion forming an L-shaped cross-section), Z-shaped, T-shape (e.g., a single horizontal portion is attached on top of a single vertical portion forming a T-shaped cross section), etc. or may have any other suitable configuration to provide a lightweight stiffener member 108 to the sandwich-type base panel 102.

In some embodiments, the materials for the stiffener-members 108 may be pre-qualified materials already suited for the aerospace or automotive industry. In some embodiments, the same materials that make up the base panel 102 may be used for the stiffener-members 108, though differing in configuration, size, and thickness to achieve the desired anti-resonant performance.

Figure 4A:
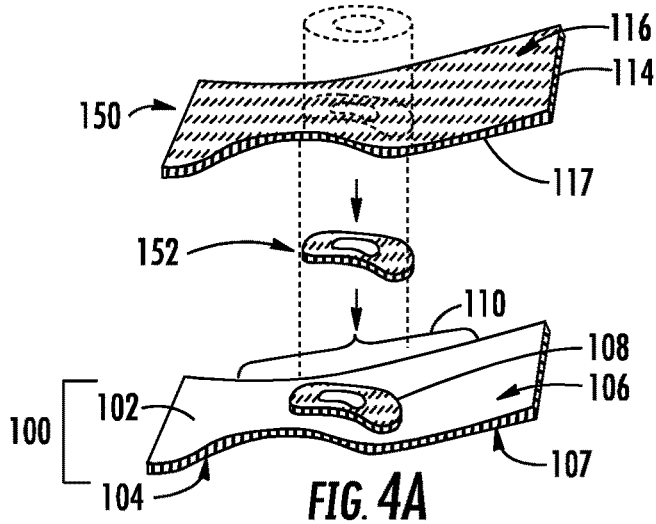
FIGS. 4A-4C illustrate exemplary methods of adjoining stiffener-members to base panels in accordance with some example embodiments described herein.
Figure 4B:
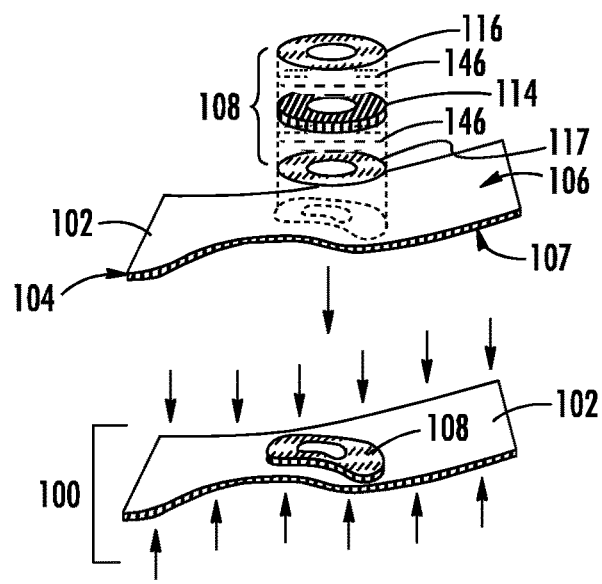
Figure 4C:
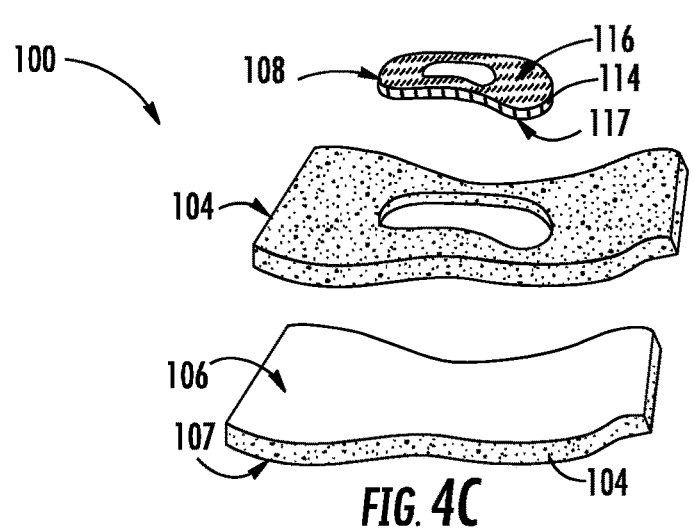

The anti-resonant performance of the anti-resonant panels 100 can be further improved by maximizing the bonding rigidity of the stiffener-member 108 to the base panel 102. The engagement of the stiffener-member 108 to the base panel 102 may be as complete as possible, especially along the perimeter or edges 120 of the stiffener-member 108. FIGS. 4A-4C provide exemplary methods of adjoining stiffener-members 108 to base panels 102. FIG. 4A provides a high-stiffness, highly-conformal stiffener-member 108 formed in a mold to fit the shape of the base panel 102. As used herein, "conformal" refers to the shaping of the item to closely fit adjacent components. For instance, with regards to the conformal stiffener-member 108, the surface of the stiffener-member 108 (e.g., one of the stiffener-member face sheets 116, 117) is immediately adjacent to the base panel 102 and follows the curvature of the base panel 102. The stiffener-member 108 geometry is traced and cut away to form the stiffener-member 108 for the anti-resonant panel 100.

Particularly beneficial for complex stiffener-members 108, the stiffener-member 108 may be pre-fabricated as stiffener-member panel stock 150 in a mold. From this stiffener-member panel stock 150, a specific area predetermined to produce the desired anti-resonant performance is cut out (stiffener-member cut-out 152) and superimposed as the stiffener-member 108 to an existing base panel 102. This method is especially practical if specific defined areas 110 requiring the stiffener-members 108 are complex or highly contoured, as shown in FIG. 4A. This treatment allows for high bonding engagement of the stiffener-member 108 to the base panel 102, which can increase the effective stiffness of the resulting anti-resonant panel 100.

The stiffener-member 108 may be joined to the base panel 102 by other methods. FIG. 4B shows an exemplary process of forming the stiffener-member 108 on the base panel 102. In particular, FIG. 4B illustrates an exemplary method of stiffener-member 108 formation by a layup process, in which the constituents (in this embodiment, the stiffener-member face sheets 116, 117, the attachment mechanisms 146, and the stiffener-member core material 114) that make up the stiffener-member 108 are flat, but flexible, allowing the constituents to take on the surface contours of the base panel 102 (including the base panel face sheets 106, 107 and base panel core material 104) during the layup process. The stiffener-member 108 and base panel 102 are then bonded together to form the anti-resonant panel 100. An autoclave may be used to achieve higher bonding pressures once the setup has been established, or sandbags may be applied over the attachment to aid in bonding. The method shown in FIG. 4B may be more cost effective and efficient than other methods.

FIG. 4C illustrates another exemplary method of adjoining stiffener-members 108 to base panels 102. In particular, in the embodiment illustrated in FIG. 4C, a stiffener-member 108 may be prepared, for example, by cutting out the stiffener-member 108 from stiffener-member panel stock 150 (see e.g., FIG. 4A), building up the stiffener-member with pre-cut constituents of the stiffener-member (see e.g., FIG. 4B), the like, or combinations thereof. The stiffener-member 108 includes a stiffener-member core material 114 and stiffener-member face sheets 116, 117. A portion of the base panel core material 104 may be removed to allow for the insertion of the stiffener-member 108. Base panel face sheets 106, 107 may then be applied to the base panel core material 104 and stiffener-member 108 forming the anti-resonant panel 100. In such embodiment, the stiffener-member 108 is incorporated into the base panel 102 thereby imparting the stiffer properties of the stiffener-member 108 to the base panel 102 and providing a resulting anti-resonant panel 100 with a flush or regular surface. In some embodiments, the stiffener-member 108 may be incorporated into the base panel 102 by adhering the stiffener-member 108 to the base panel core material 104 and then applying base panel face sheets 106, 107 over both the stiffener-member 108 and the base panel core material 104 without cutting out a portion of the base panel core material 104. Variations on these methods may be used without deviating from the intent of the present disclosure and other methods can be used to achieve similar results based on available supplies or capital.

Once a design for the stiffener-member 108 is designated, the stiffener-member 108 can be attached to the base panel 102 by several means, with some examples shown in FIGS. 5A and 5B. In particular, FIGS. 5A and 5B provide exemplary processes for attaching a stiffener-member 108 to a base panel 102. In FIG. 5A, the stiffener-member 108 is pre-fabricated and attached by way of mechanical fasteners (e.g., attachment mechanism 146) to the base panel 102. FIG. 5A also shows a cross-section of the resulting anti-resonant panel 100. In FIG. 5B, the stiffener-member 108 is pre-fabricated and attached by way of adhesive film (e.g., attachment mechanism 146) and an auto-clave layup to the base panel 102. FIG. 5B also shows a cross-section of the resulting anti-resonant panel 100 illustrating the direct attachment of the stiffener-member 108 to the base panel 102. Variations in bonding techniques can be used, such as hot press, vacuum bagging, sand-bagging, the like, and combinations thereof and various materials can be used such as screws, adhesive, adhesive film, rivet, and combinations thereof. For instance, in one embodiment, a rigid foam-forming adhesive may be used to ensure gaps are securely filled and adhered between the two interfaces (e.g., between the stiffener-member 108 (e.g., one or more stiffener-member face sheets) and the base panel 102). Various methods in attaching the components may be used without deviating from the intent and scope of the present disclosure. For instance, in some embodiments, it may be desirable to combine one or more fabrication and adhesion techniques from FIGS. 4A-4C and FIGS. 5A-5B.

FIGS. 6A-6D are exemplary base panels 102, particularly sandwich-type base panels 102, which may be used for the anti-resonant panels 100 as described herein. Each of the base panels 102 depicted in FIGS. 6A-6D include base panel face sheets 106, 107 and base panel core material 104 making the panels sandwich-type base panels 102. While the embodiments illustrated in FIGS. 6A-6D use the same base panel face sheets 106, 107 for either side of the base panel core material 104, the base panel face sheets 106, 107 may vary within an anti-resonant panel 100 (that is, different types (i.e., materials) of base panel face sheets 106, 107 may be used on opposite sides of the base panel core material 104 and/or along the same side of the base panel core material 104). In addition, while the embodiments illustrated in FIGS. 6A-6D use the same base panel core material 104 for the length and width of the base panel 102, the base panel core material 104 may vary within an anti-resonant panel 100.

FIG. 6A is a flat sandwich-type base panel 102 with carbon-fiber base panel face sheets 106, 107 surrounding an aramid honeycomb base panel core material 104. FIG. 6B is a contoured sandwich-type base panel 102 of the same materials used in FIG. 6A with a thicker base panel core material 104 and contoured shape (base panel face sheets 106, 107 and base panel core material 104). FIG. 6C is a flat sandwich-type composite base panel 102 with fiberglass base panel face sheets 106, 107 surrounding an aramid honeycomb base panel core material 104 with in-plane contoured cutouts. FIG. 6D is a sandwich-type base panel 102 composed of thin aluminum base panel face sheets 106, 107 surrounding a PET foam base panel core material 104. The thickness of the base panel 102, particularly the base panel core material 104, in FIG. 6D is varied along the base panel 102 to create a contoured portion 160 of the base panel 102. The contoured base panels 102 may include a variety of curvature and angles to provide the desired shape and configuration. For instance, the base panel 102 may be contoured in various portions of the base panel 102 to specifically fit the desired location in the wall in which the anti-resonant panel 100 is to be used and/or to achieve the desired noise-insulating performance of the anti-resonant panel 100.

The base panels 102 of the present disclosure are not limited to those shown in FIGS. 6A-6D and may include a variety of materials in a variety of configurations without deviating from the intent and scope of the present disclosure. For instance, the base panels 102 in the anti-resonant panels 100 can be a combination of these materials and/or other materials and designs that create lightweight and stiff paneling with anti-resonant performance.

As panel size increases, the anti-resonant sound-blocking performance may become vulnerable to the low-frequency range of audible frequencies, e.g., 300 Hz-1000 Hz, as the effective acoustic boundaries expand. This behavior is usually governed by the creation of undesirable vibro-acoustic modes having characteristic geometric patterns super-positioned on the panel at distinct frequencies. Mitigation of these modes can be addressed by modifying specific locations on the panel, as determined from various tools used in acoustic measurement and modeling, with the use of the stiffener-members 108. Additional components may be added to the anti-resonant panels 100 to provide improved performance. For example, inertial members 126 (see e.g., FIG. 7), reinforcing members 128 (see e.g., FIGS. 8A and 8B), grounding members 134 (see e.g., FIGS. 9A and 9B), and combinations thereof may be added to strategic panel locations to further improve the anti-resonance of the anti-resonant panels 100. These treatments can further tune the anti-resonant performance of the anti-resonant panels 100. In some embodiments, the additional components may provide a wider bandwidth of transmission loss, may shift the bandwidth to higher frequencies, or combinations thereof. As an added benefit, inertial members 126 and/or grounding members 134 along the defined acoustic boundary 132 of the sub-divided anti-resonant panel 100 are effective to increase the quality factor (Q) of the anti-resonant performance, increasing the sound-blocking performance even further.

Figure 7:
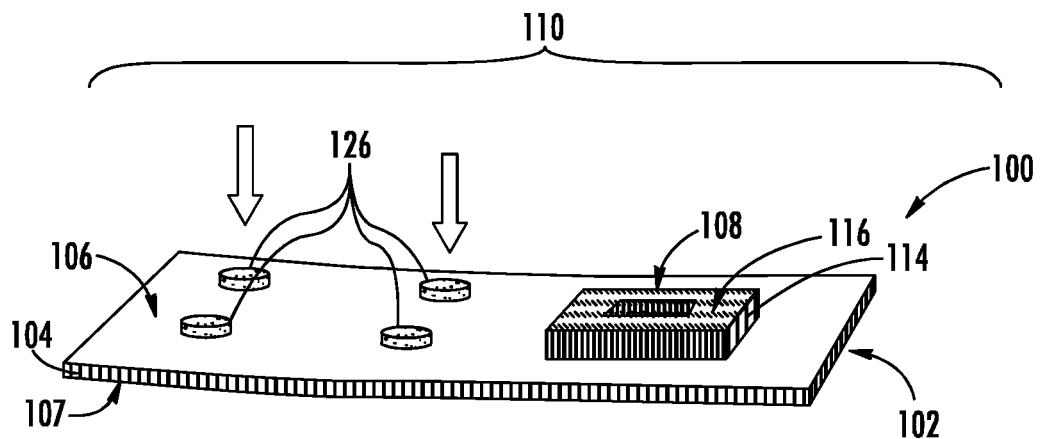
FIG. 7 illustrates the addition of exemplary inertial members to anti-resonant panels in accordance with some example embodiments described herein.

Inertial members 126 are generally discrete high-density components added to the anti-resonant panel 100 to provide a relatively small amount of mass in a specific portion of the anti-resonant panels 100. The anti-resonant panel 100 may include at least one inertial member 126. The inertial member 126 is configured to provide a mass increase over the defined area 110 of the anti-resonant panel 100. For instance, as shown in FIG. 7, one or more inertial members 126 may be added to the anti-resonant panel 100. In such an instances, the inertial members 126 include material(s) and have a geometry to increase the mass density of the anti-resonant panel 100 at the particular location of the inertial member 126. That is, the inertial members 126 provide high mass density in a small diameter (e.g., the inertial members 126 generally have a smaller diameter than the diameter of the stiffener-members 108, but have a higher mass density than the mass density of the stiffener-members 108). In some embodiments, the inertial members 126 may have a mass density of about 5, 10, or more times the mass density of the stiffener-members 108 and are generally too small in size to provide stiffness to the anti-resonant panels 100 (e.g., the inertial members 126 have a smaller diameter than the diameter of the stiffener-members 108 and do not provide the stiffness that the stiffener-members 108 are able to provide). The inertial member 126 may have a mass density of about 10 times a mass density of the stiffener-member 108. The mass density may be such that a high increase in mass is provided over a small diameter to effectively increase the mass at that location without significantly increasing the total mass of the anti-resonant panel 100. In comparison, the stiffener-member 108 may increase the stiffness of the panel without significantly increasing the mass of the panel.

For instance, the density of the inertial members 126 may be about 0.5 kg/m$^3$ to about 30 kg/m$^3$, such as about 1 kg/m$^3$ to about 20 kg/m$^3$. The inertial members 126 provide concentrated masses at a particular location that shift local modes out of the target frequency range or suppress the local vibrations (e.g., FIG. 15). In some embodiments, there is a diminishing return in transmission loss gained as mass increases with the incorporation of inertial members 126. Thus, the addition of inertial members 126 is a balance between the increase in mass and the desired transmission loss in the desired frequency range. The addition of the inertial members 126 as point-masses can help maintain anti-resonance with minimal mass penalty. The inertial members 126 may include solid aluminum, rubber, tungsten, ceramic, or a combination thereof as such materials provide a relatively high mass density without significantly increasing the mass of the panel.

The inertial members 126 provided herein may be of any suitable geometry and material to provide a relatively small amount of mass to help tune the acoustic properties of the anti-resonant panels 100. The inertial members 126 may be fastened using attachment mechanisms (e.g., attachment mechanisms 146), such as mechanical fasteners, adhesives, other methods noted herein, the like, or combinations thereof. Although the inertial members 126 can embody any shape, the inertial members 126 are constrained to being effective as point-masses irrelevant of shape.

FIG. 7 illustrates the incorporation of exemplary inertial members 126 to an anti-resonant panel 100. FIG. 7 illustrates both inertial members 126 and a stiffener-member 108 (one stiffener-member face sheet 116 and the stiffener-member core material 114 are shown) on a sandwich-type base panel 102 (including base panel face sheets 106, 107 and base panel core material 104) forming an anti-resonant panel 100.

Figure 9A:
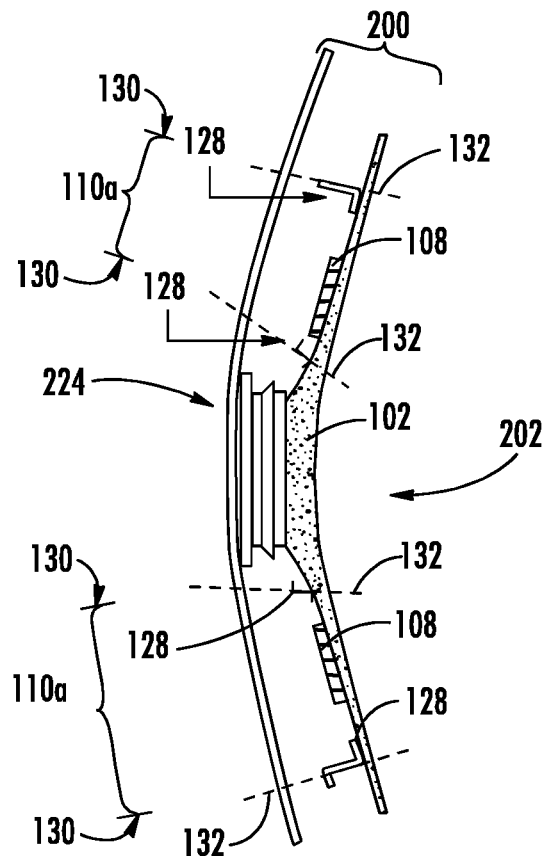
FIGS. 9A and 9B illustrate the addition of exemplary reinforcing members to anti-resonant panels in accordance with some example embodiments described herein.
Figure 9B:
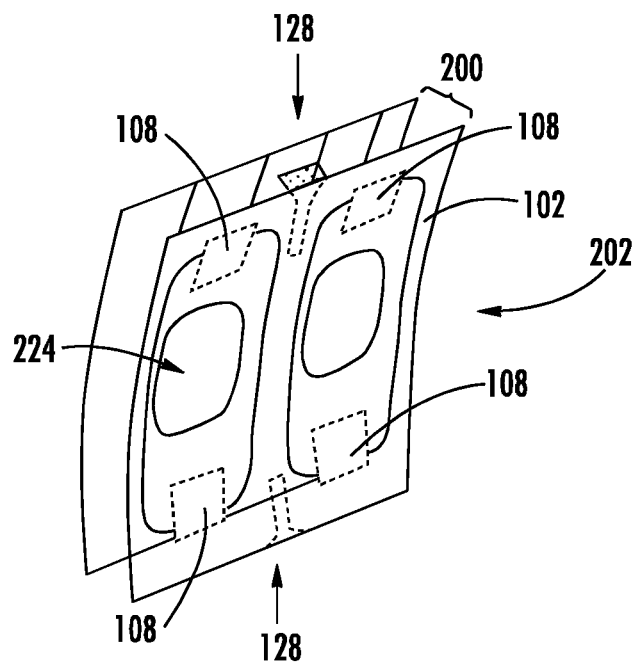

Another treatment to preserve the anti-resonant performance is the use of reinforcing members 128 to reinforce regions of the anti-resonant panel 100 (see e.g., FIGS. 9A and 9B). The anti-resonant panel 100 may include a reinforcing member 128. The reinforcing member 128 is disposed along a perimeter 130 of the defined area 110 of the base panel 102 and defines an acoustic boundary 132 for the defined area 110 of the base panel 102. The reinforcing members 128 divide the anti-resonant panels 100 acoustically by imposing a barrier at the particular location along the anti-resonant panel 100, forming acoustic boundaries 132. The reinforcing members 128 can help improve control of the overall acoustic performance of the anti-resonant panel 100 with such division. The reinforcing members 128 can be placed in any orientation and any number of the reinforcing members 128 may be used in positions suitable to improve the anti-resonant performance. The reinforcing members 128 may help delineate acoustic boundaries 132 of the anti-resonant panel 100, in particular non-planar or contoured anti-resonant panel 100.

Figure 8:
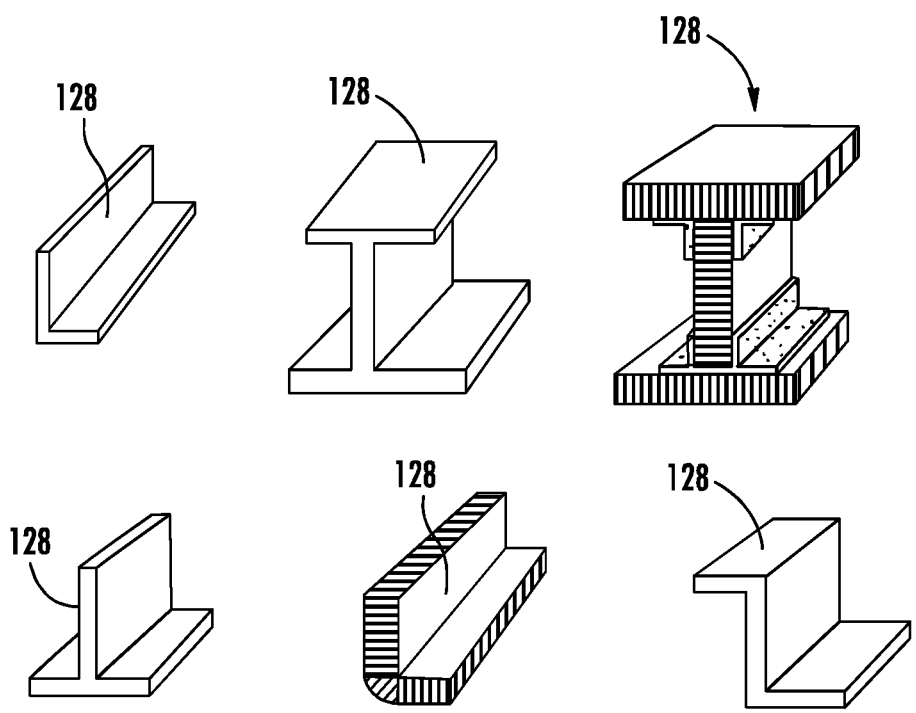
FIG. 8 illustrates exemplary reinforcing members in accordance with some example embodiments described herein.

FIG. 8 illustrates cross-sectional profiles of exemplary reinforcing members 128 that can be used for the reinforcement of various anti-resonant panels 100. Solid construction-type and sandwich-type reinforcing members 128 are shown. The cross-sectional geometry of the reinforcing members 128 can embody several types commonly used in the industry (I-shaped, L-shaped, Z-shaped, T-shaped, etc.), as well as newer or more complex cross-sectional geometries that maximize the stiffness-to-mass ratio. The length and size of the reinforcing members 128 may be designed to achieve particular anti-resonant performance.

The reinforcing members 128 can be made out of any type of material, can be a composite material, have a sandwich-type construction, the like, or combinations thereof suitable to provide a lightweight component with a high bending stiffness (e.g., comparable to the stiffener-member 108). The attachment mechanism 146 for the reinforcing members 128 can be those used in attaching the stiffener-members 108 described earlier, or other mechanisms favorable for constraining vibratory movement with a minimal mass-density penalty over the footprint of the reinforcing member 128. The reinforcing members 128 may include various materials, such as pre-approved composite materials, such as those found in the construction of base panels 102. The reinforcing members 128 can be configured in perimeter configurations similar to the perimeter-type stiffener-members 118 so long as the reinforcing members 128 enhance the partition of the anti-resonant panels 100 creating acoustic boundaries 132 for higher efficiency anti-resonant panels 100. The reinforcing members 128 are generally elongate members (length greater than width).

FIG. 9A illustrates exemplary reinforcing members 128 that are able to further improve the anti-resonance control for the anti-resonant panels 100 and boost transmission loss. More specifically, FIG. 9A illustrates a profile view of a system 200 including reinforcing members 128 used to horizontally reinforce anti-resonant panels 100 employed as an aircraft cabin panel 202. FIG. 9B illustrates a system 200 including vertical sandwich-type reinforcing members 128 to reinforce portions of the anti-resonant panels 100 employed as an aircraft cabin panel 202. Various configurations of the reinforcing members 128 may be used to improve the anti-resonant performance of the anti-resonant panels.

Periodically mounting the anti-resonant panels 100 to a structure 136, such as a fuselage skin 137 (see e.g., FIG. 14) or a window 224 (see e.g., FIGS. 9A and 9B), may be used to further redefine the acoustic boundaries 132, favoring anti-resonant performance (see e.g., FIGS. 10A and 10B).

Referring to FIGS. 10A and 10B, grounding members 134 can be used to anchor the anti-resonant panels 100 to other components of the structure 136, such as a fuselage skin 137 or a window 224. The anti-resonant panel 100 may include a grounding member 134. The grounding member 134 is configured to anchor the anti-resonant panel 100 to a structure 136, such as a fuselage skin 137 or a window 224, and define an acoustic boundary 132 for the defined area 110 of the base panel 102. Grounding members 134 may take advantage of existing parts of the structure 136 (e.g., those that have high mass, such as a fuselage skin 137 or a window 224) to provide the anti-resonant panels 100 more stable vibratory acoustic boundaries 132. The grounding members 134 can help isolate and control vibrations and improve the anti-resonant performance of the anti-resonant panel 100.

In embodiments where the anti-resonant panels 100 are used in aircraft (see e.g., aircraft 145 in FIG. 13), several locations along the fuselage skin 137 can be used as anchoring points to attach grounding members 134 to the anti-resonant panels 100 to further improve anti-resonant performance. Convenient anchoring locations on portions of the fuselage skin 137 can be used, such as the windows 224, stringers, circumferential frame portions, or similar points nearby. The selection of anchoring points for attaching grounding members 134 to the anti-resonant panels 100 can include nearby components as well that are anchored to the fuselage skin 137 to reduce the additional mass of fasteners or parts required to achieve effective anchoring performance.

FIG. 10A illustrates a profile view of an exemplary system 200 including the anti-resonant panels 100 and the adjacent fuselage skin 137 and FIG. 10B illustrates a back-facing view of an exemplary system 200 including of anti-resonant panels 100 and the adjacent fuselage skin 137. Exemplary grounding members 134 are illustrated. The grounding members 134 are attached at specific portions of the anti-resonant panel 100 to form suitable acoustic boundaries 132 favorable to anti-resonant performance. The grounding members 134 can include brackets, anchoring bolts, other fasteners, or combinations thereof that have the capacity to anchor the portion of anti-resonant panel 100 on which the grounding members 134 are attached and the adjoining fuselage skin 137. Further, damping can be added along the anchoring grounding member 134 to reduce induced vibration from the fuselage skin 137 to the anti-resonant panel 100 at the attachment point or area.

In aircraft (see e.g., aircraft 145 in FIG. 14), while the aircraft trim panels 154 define the side walls of the cabin of the vehicle, the fuselage skin 137 located behind the trim panel 154 acts as the exterior vehicle body. The gap between these two components (the trim panel 154 and the fuselage skin 137) can be acoustically exploited, in which the overall acoustic attenuation can be increased over a wide bandwidth. This architecture may be referred to as a double-pane architecture. The trim panels 154 may be replaced with one or more anti-resonant panels 100 having a base panel 102 and one or more stiffener-members 108. Accordingly, the anti-resonant panel 100 act as an interior side wall panel that at least partially defines an enclosed cabin 155 of the aircraft 145.

The double-pane acoustic effect generally has two low-frequency resonant modes, as shown for example in FIGS. 11A and 11B, then a rapid increase in acoustic attenuation as the frequency increases. If properly accounted for, the anti-resonance of the anti-resonant panel 100 and the double-pane effect can work together to extend the overall acoustic transmission loss through the anti-resonant panel 100 into the enclosed structure (e.g., enclosed cabin 155 of FIG. 14). FIGS. 11A and 11B illustrate exemplary double-pane effects caused by two structures (e.g., fuselage skin 137 and anti-resonant panel 100) resonating in phase with each other (FIG. 11A) and out of phase with each other (FIG. 11B).

Figure 12:
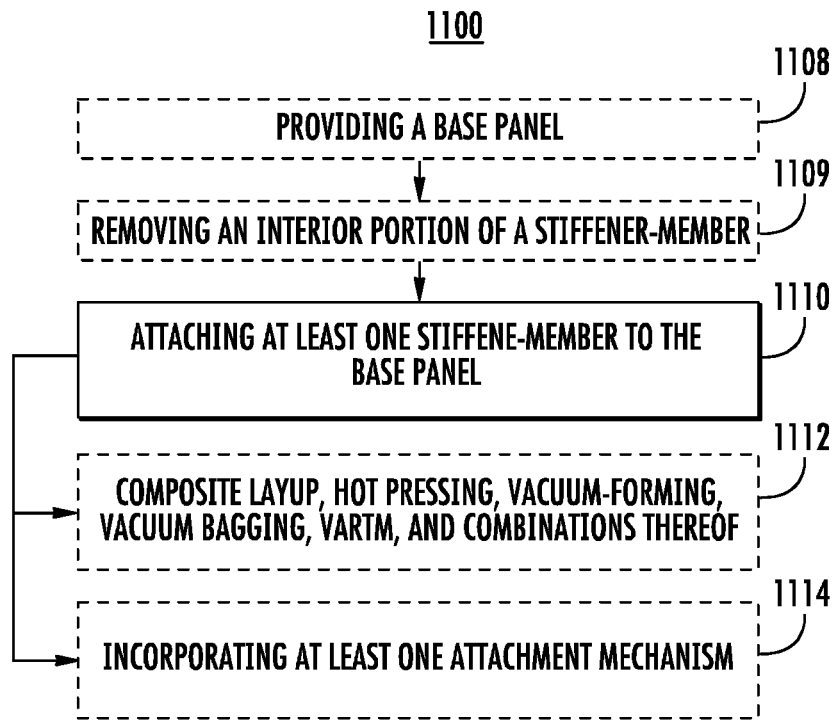
FIG. 12 is a flow chart for an exemplary method of providing noise insulation in accordance with some example embodiments described herein.

Referring to FIG. 12, in some embodiments, a method 1100 is provided for making an anti-resonant panel 100 having a base panel 102 with a base panel core material 104 and two base panel face sheets 106, 107. Each of the two base panel face sheets 106, 107 are adjacent to an opposite side of the base panel core material 104. The method 1100 includes attaching at least one stiffener-member 108 to a base panel 102 (step 1110). As described above, the stiffener-member 108 is disposed along the base panel 102 in a defined area 110 of the base panel 102, and the base panel 102 includes a base panel core material 104 and two base panel face sheets 106, 107. The stiffener-member 108 includes a stiffener-member core material 114 and two stiffener-member face sheets 116, 117. The stiffener-member 108 is configured to provide anti-resonant performance to the base panel 102. In some embodiments, attaching the stiffener-member 108 to the base panel 102 may include composite layup, hot-pressing, vacuum-forming, vacuum bagging, vacuum assisted resin transfer molding (VARTM), or a combination thereof (step 1112). In some embodiments, attaching the stiffener-member 108 to the base panel 102 may include incorporating at least one of an attachment mechanism 146 comprising a screw, adhesive, adhesive film, rivet, or a combination thereof to attach the stiffener-member 108 to the base panel 102 (step 1114).

FIG. 12 illustrates an exemplary method 1100 of providing noise insulation to a structure (e.g., a fuselage skin 137) in accordance with some example embodiments described herein. In particular, method 1100 is illustrated which includes attaching at least one stiffener-member 108 to the base panel 102 (step 1110) (see e.g., FIGS. 2A-2G, 4A-4C, 5A and 5B and the description related to each provided herein). The method 1100 may also include providing a base panel 102 comprising a base panel core material 104 and two base panel face sheets 106, 107 (step 1108) (see e.g., FIGS. 6A-6D). As described above, attaching the stiffener-member 108 to the base panel 102 may include composite layup, hot-pressing, vacuum-forming, vacuum bagging, VARTM, and combinations thereof (step 1112). Attaching the stiffener-member 108 to the base panel 102 may include incorporating at least one attachment mechanism 146 including a screw, adhesive, adhesive film, rivet, or combinations thereof to attach the stiffener-member 108 to the base panel 102, as shown in step 1114. Various embodiments as disclosed herein may be incorporated into methods of providing noise insulation.

In some embodiments, the method 1100 may include removing an interior portion 148 of the stiffener-member 108 creating a hollowed portion 124 in the stiffener-member 108 prior to attaching at least one stiffener-member 108 to the base panel 102 (step 1109).

Figure 13:
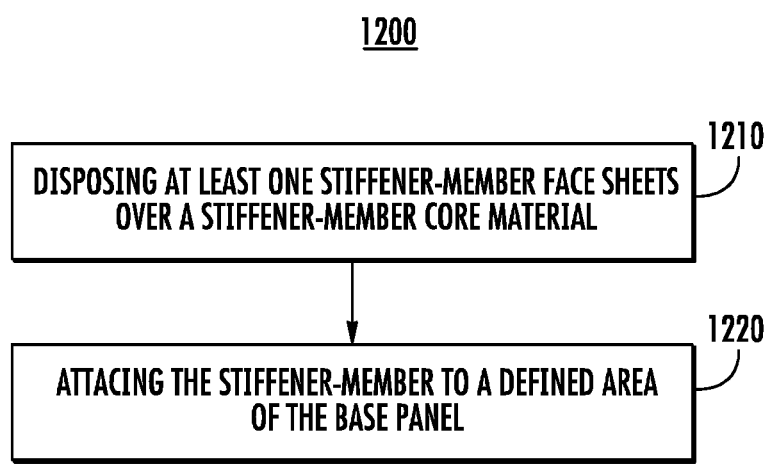
FIG. 13 is a flow chart for an exemplary method of forming an anti-resonant panel in accordance with some example embodiments described herein.

FIG. 13 is a flow chart for an exemplary method 1200 of forming an anti-resonant panel 100 in accordance with some example embodiments described herein. In particular, method 1200 includes forming a stiffener-member 108 configured to provide anti-resonant performance to a base panel 102 by disposing at least one stiffener-member face sheets 116 and/or 117 over a stiffener-member core material 114 (step 1210) and attaching the stiffener-member 108 to a defined area 110 of the base panel 102 (step 1220). Various embodiments as disclosed herein may be incorporated into methods of providing noise insulation.

Referring again to FIGS. 9A and 9B, FIGS. 10A and 10B, and FIGS. 11A and 11B, in some embodiments, a system 200 may be provided that includes a structure 136 (e.g., fuselage skin 137) and at least one anti-resonant panel 100 adjacent the structure (e.g., fuselage skin 137). The structure 136 (e.g., fuselage skin 137) defines an exterior section 138a and an interior section 138b and may form an enclosed cabin 155. The structure 136 (e.g., fuselage skin 137) is adjacent to the anti-resonant panel 100 and may work in conjunction with the anti-resonant panel 100 to provide improved noise-insulation (see e.g., grounding members 134 discussed with regards to FIGS. 10A and 10B and/or double pane effect discussed with regards to FIGS. 11A and 11B). In some embodiments, the anti-resonant panel 100 is used in an aircraft (e.g., aircraft 145), where the aircraft is the system 200 having the anti-resonant panel 100.

Figure 14:
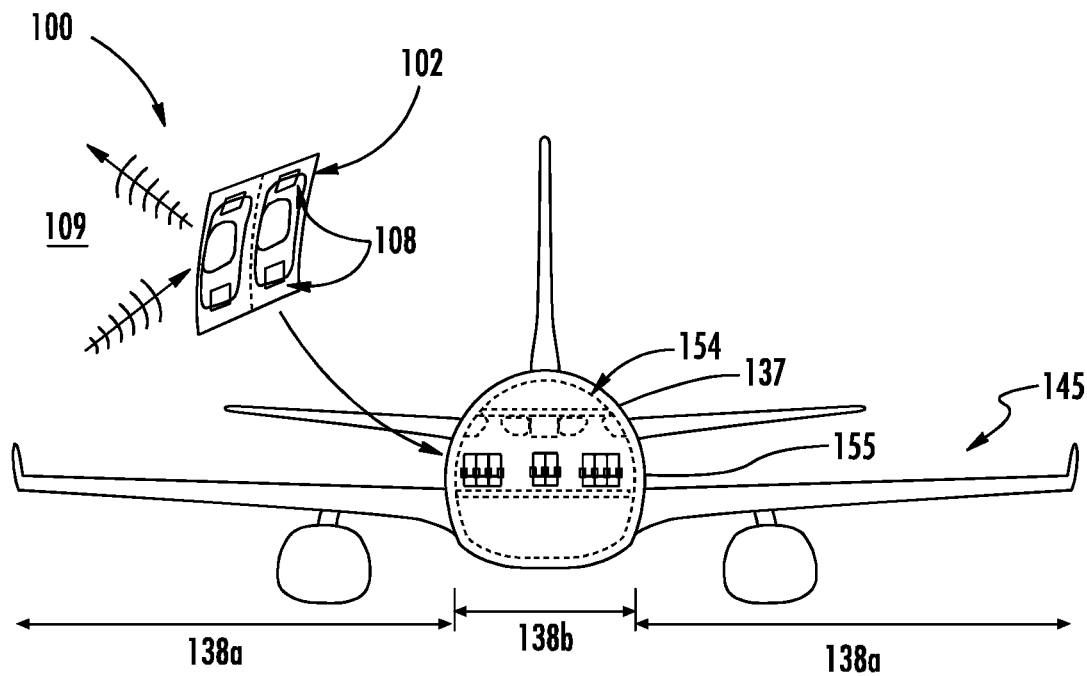
FIG. 14 illustrates exemplary areas where the anti-resonant panels may be used in an aircraft and illustrates exemplary anti-resonant treatment to a sidewall panel of the aircraft in accordance with some example embodiments described herein.

FIG. 14 provides exemplary areas where the anti-resonant panels 100 may be used on an aircraft 145 and provides an example of anti-resonant panels 100 incorporated with the fuselage skin 137 of the aircraft 145 forming an enclosed cabin 155. The anti-resonant panels 100 may be added to the aircraft 145 as an addition or substitution where the trim panels 154 are located. For instance, the stiffener-members 108 may be incorporated onto a base panel 102, which enables broadband sound-blocking performance of the anti-resonant panel 100. FIG. 14 provides one example of the application of the stiffener-members 108; however, the stiffener-members 108 may be added to various locations throughout the enclosed cabin 155. As shown in FIG. 14, the incorporation of the stiffener-members 108 to the base panels 102 provides improved sound blocking as compared to the base panel 102 alone. Sound waves 109 are reflected off the anti-resonant panels 100. The anti-resonant panels 100 thereby provide improved noise blocking for the enclosed cabin 155, particularly at low frequencies.

In some embodiments, noise insulation may be provided to an enclosed cabin 155. Noise insulation may be provided to an enclosed cabin 155 by positioning at least one anti-resonant panel 100 adjacent to the enclosed cabin 155, the at least one anti-resonant panel 100 comprising a base panel 102 and at least one stiffener-member 108 attached to the base panel 102, wherein the at least one stiffener-member 108 provides anti-resonant performance to the base panel 102 to reduce noise propagation into the enclosed cabin 155. In some embodiments, positioning at least one anti-resonant panel 100 adjacent to the enclosed cabin 155 includes positioning the anti-resonant panel 100 as previously described adjacent the enclosed cabin 155. In some embodiments, the at least one anti-resonant panel 100 may be coupled to the enclosed cabin 155. In some embodiments, the at least one anti-resonant panel 100 may be coupled to the enclosed cabin 155 using grounding members 134.

Figure 15:
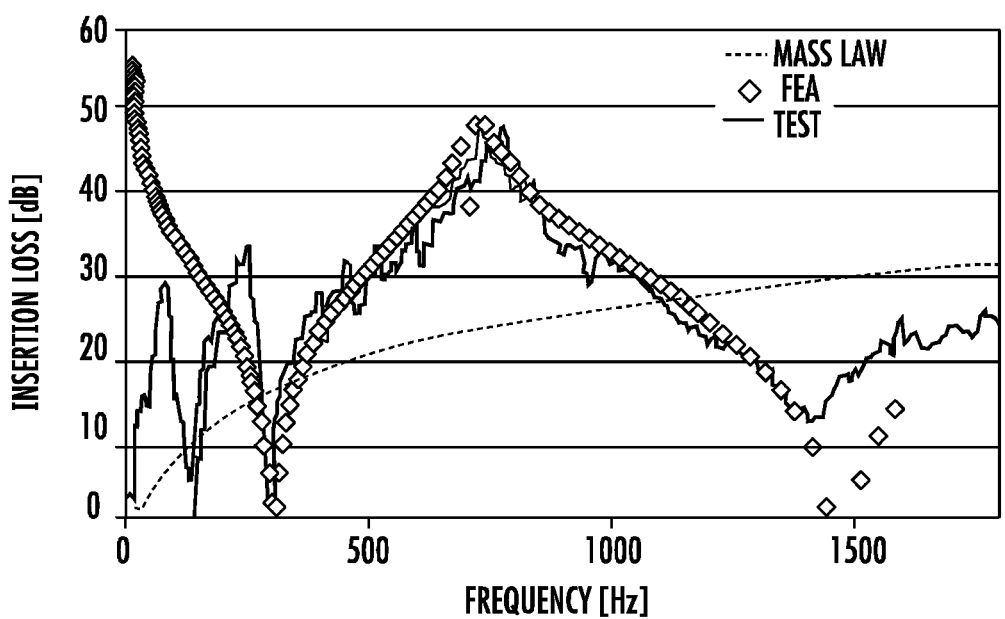
FIG. 15 illustrates the insertion loss of an exemplary anti-resonant panel in accordance with some example embodiments described herein.

An example of effective anti-resonant performance is depicted in FIG. 15. In particular, FIG. 15 illustrates an exemplary prediction using the finite element analysis (FEA) method and experimentally measured results. The performance shown in FIG. 15 is merely representative and is relative to the noise that may be blocked. The performance shown in FIG. 15 is not intended to limit the present disclosure. FIG. 15 shows the insertion loss performance of an anti-resonant panel 100 (solid line), along with the matched FEA prediction (depicted as diamonds). The dashed curve is the equivalent mass law prediction using an identical mass density of an isotropic plate. As shown in FIG. 15, the anti-resonant panel 100 may provide improved noise blocking, particularly at relatively low frequencies, and much higher noise blocking than seen with an equivalent mass density. As shown in FIG. 15, in this embodiment, the equivalent mass to achieve the shown loss in noise is about sixteen (16) times that used in the anti-resonant panel 100. Other degrees of improvement may be possible.

Figure 16:
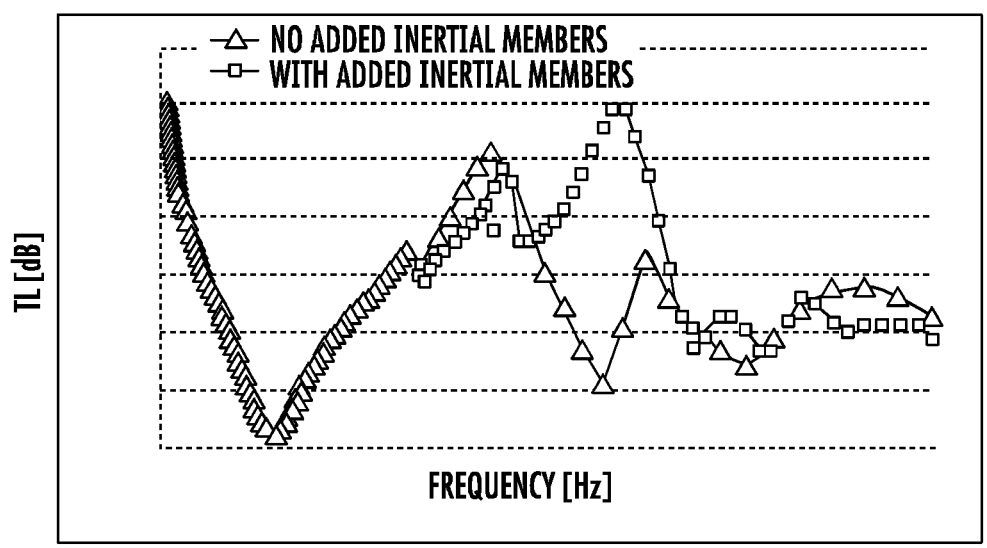
FIG. 16 illustrates the addition of exemplary inertial members to anti-resonant panels in accordance with some example embodiments described herein.

FIG. 16 illustrates an effect of adding exemplary inertial members 126 to an anti-resonant panel 100 to enable a wider bandwidth of anti-resonant performance in an exemplary embodiment. As shown in FIG. 16, in some embodiments, the addition of the inertial members 126 (shown by squares) may provide a wider bandwidth of anti-resonant performance compared to an embodiment without the inertial member 126 (shown by triangles). In some embodiments, the addition of the inertial members 126 may reduce dips in anti-resonant performance seen in embodiments without the inertial members 126. The inertial members 126 generally help tune the acoustic performance of the anti-resonant panel 100, providing a wider bandwidth of anti-resonant performance. The inertial members 126 may define a new acoustic boundary 132 point, line, or area, and may enable the creation of a better-defined anti-resonant panel 100. The inertial members 126 may help move the resonance frequencies away from the target frequency range.

Figure 17:
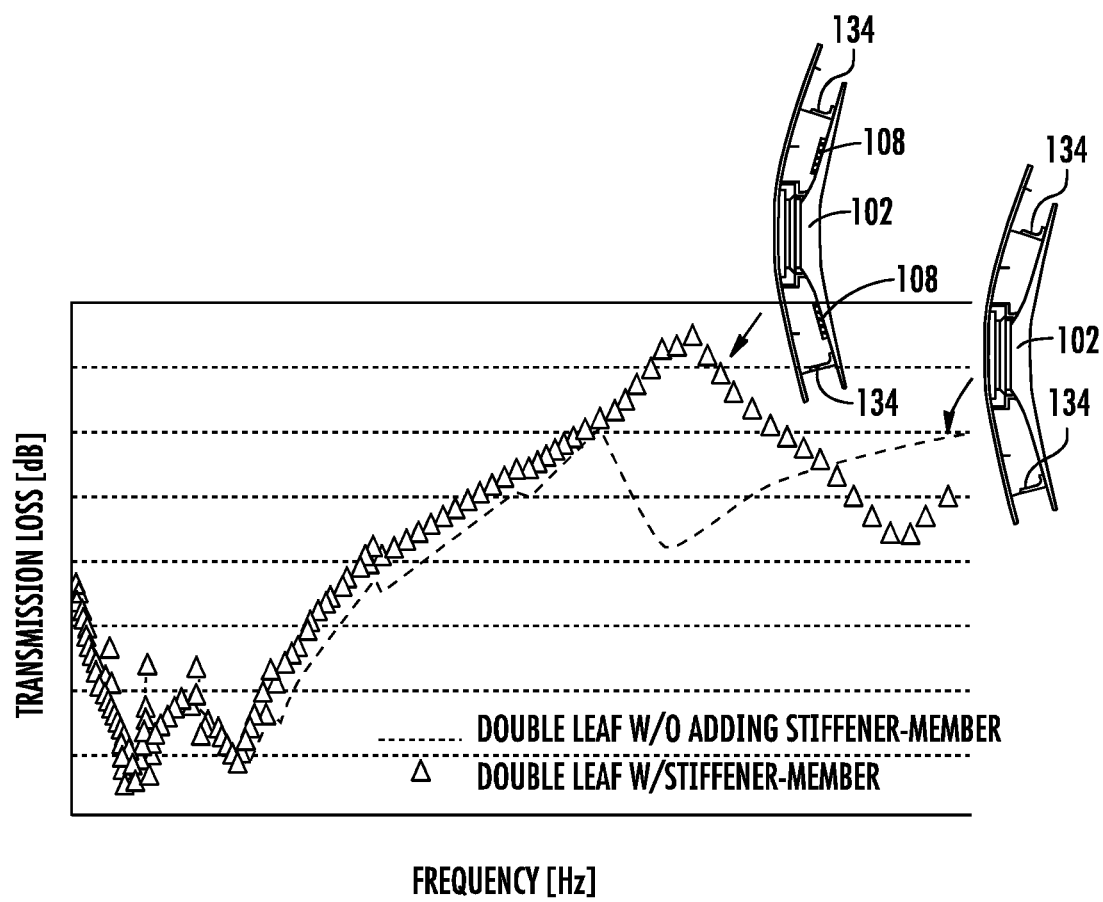
FIG. 17 illustrates the double pane effect seen in exemplary anti-resonant panels in accordance with some example embodiments described herein.

FIG. 17 illustrates how the anti-resonance and double pane effects may add together to attenuate a very large acoustic frequency band gap. In particular, FIG. 17 illustrates an exemplary predicted transmission loss performance comparison using the double-pane effect between the untreated trim panels (dashed curve) (including a base panel 102 and grounding members 134) and anti-resonant trim panels (triangle marks) (including a base panel 102, grounding members 134, and stiffener-members 108). For instance, as shown in this embodiment, the low-frequency transmission-loss performance may increase, and any dips in the transmission loss may shift to a higher frequency thereby providing improved noise insulation for lower frequencies.

Figure 18:
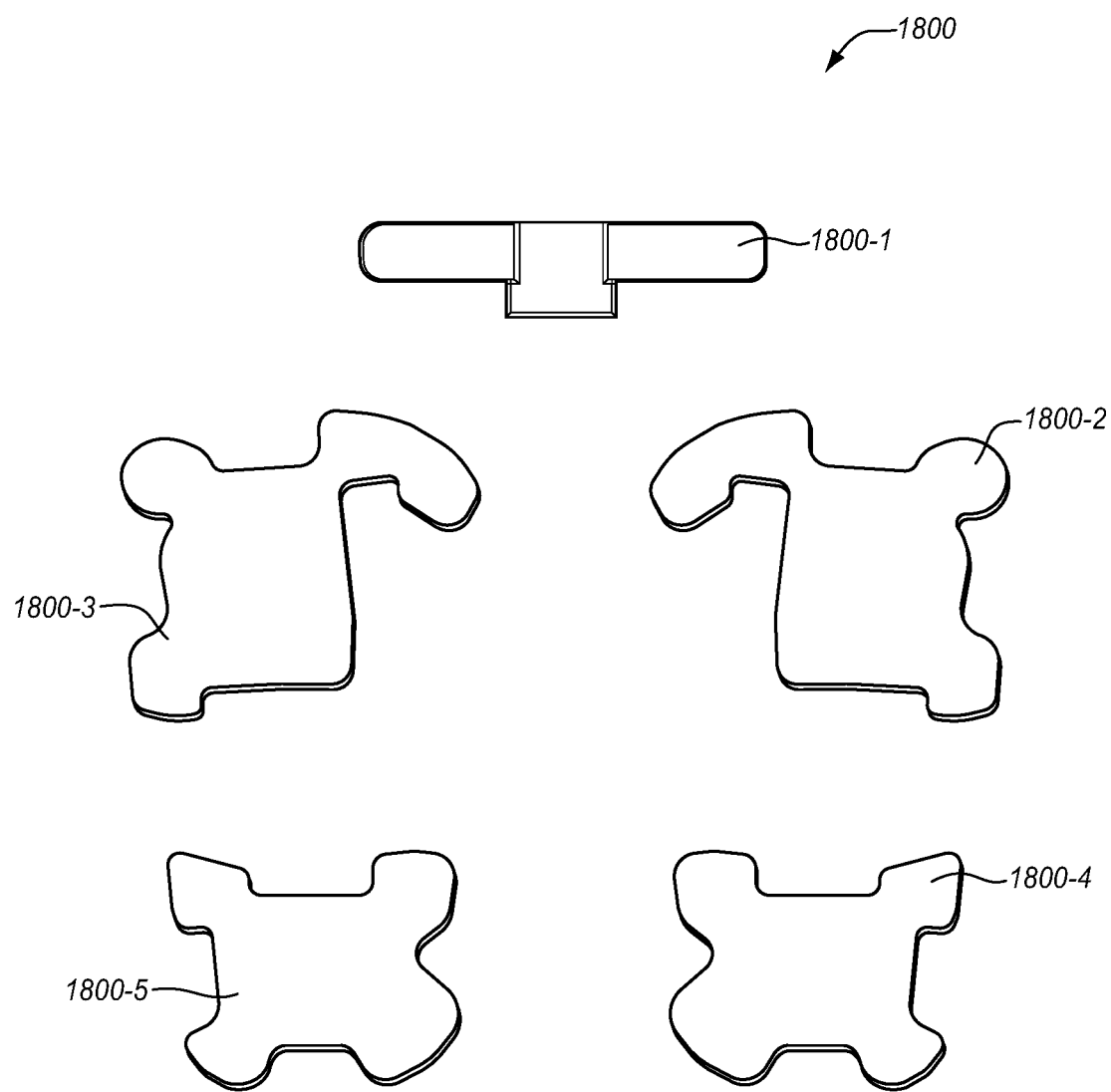
FIG. 18 depicts exemplary shapes of stiffener-members for anti-resonate panels in an illustrative embodiment.

FIG. 18 depicts exemplary shapes of stiffener-members 1800 for anti-resonate panels 100 in an illustrative embodiment. The shapes illustrated for stiffener-members 1800 in FIG. 18 are not all inclusive, and stiffener-members 1800 have other shapes in other embodiments.

In this embodiment, stiffener-members 1800 comprise an Additively Manufactured (AM) component formed from aircraft-rated materials, such as Nylon (e.g., Nylon 12). The use of an AM process for fabricating stiffener-members 1800 allows stiffener-members 1800 to be formed into a variety of shapes quickly and efficiently, thereby providing a technical benefit during noise mitigation testing. Further, the use of an AM process for stiffener-members 1800 allows stiffener-members 1800 to be formed to have a variety of dimensions, thereby providing a technical benefit during noise mitigation testing. Generally, stiffener-members 1800 operate similarly to stiffener-members 108 to provide anti-resonate performance to base panels 102, as previously described. Thus the previously described benefits, capabilities, and performance of using stiffener-members 108 for anti-resonant panels 100 applies equally to use of stiffener-members 1800 for anti-resonant panels 100.

In one non-limiting example, stiffener-members 1800 are formed using Selective Laser Sintering (SLS). SLS is an AM technique that uses a laser as the power source to sinter powdered material together to form a solid structure. SLS involves the use of a high-power laser (for example, a carbon dioxide laser) to fuse small particles of plastic, metal, ceramic, or glass powders into a mass that has a desired three-dimensional shape. The laser selectively fuses powdered material by scanning cross-sections generated from a 3-D digital description of the part (for example from a CAD file or scan data) on the surface of a powder bed. After each cross-section is scanned, the powder bed is lowered by one layer thickness, a new layer of material is applied on top, and the process is repeated until the part is completed.

SLS has many benefits over traditional manufacturing techniques. The ability to quickly produce a unique part is the most obvious because no special tooling is required and the parts can be built in a matter of hours. Since the components are built layer by layer, it is possible to design internal features and passages that could not be cast or otherwise machined. Complex geometries and assemblies with multiple components can be simplified to a single component. Further, since SLS does not require special tooling like castings, it is convenient for short production runs.

Referring again to FIG. 18, five exemplary shapes of stiffener-members 1800 are illustrated. In particular, FIG. 18 illustrates stiffener-member 1800-1, stiffener-member 1800-2, stiffener-member 1800-3, stiffener-member 1800-4, and stiffener-member 1800-5. In this embodiment, stiffener-member 1800-2 and stiffener-member 1800-3 are mirror images of each other, and stiffener-member 1800-4 and stiffener-member 1800-5 are also mirror images of each other. Although not illustrated in FIG. 18, stiffener-members 1800 comprise a stiffener-member core and a stiffener-member face sheet that form a seamless single component part. As stiffener-members 1800 in this embodiment are formed from an AM process, both the stiffener-member core and the stiffener-member face sheet are formed layer-by-layer using a series of manufacturing steps.

Figure 19:
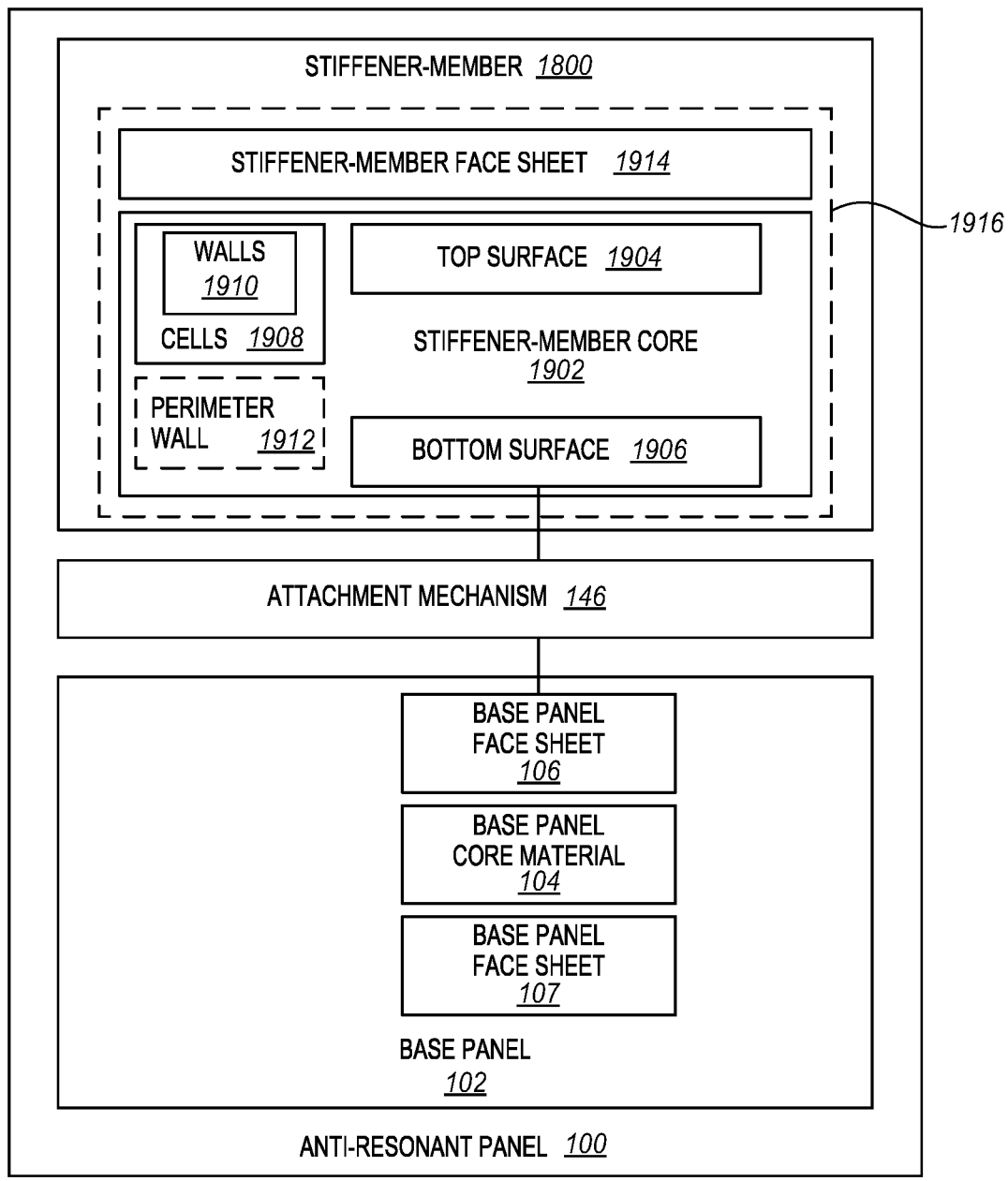
FIG. 19 is a block diagram of an anti-resonant panel utilizing a stiffener-member in an illustrative embodiment.

FIG. 19 is a block diagram of anti-resonant panel 100 utilizing stiffener-member 1800 in an illustrative embodiment. In this embodiment, stiffener-member 1800 includes a stiffener-member core 1902 having a top surface 1904, a bottom surface 1906, and a plurality of cells 1908 formed from walls 1910 that extend from top surface 1904 to bottom surface 1906. In one embodiment, cells 1908 comprise hexagonal cells formed from walls 1910. In another embodiment, cells 1908 are surrounded by a perimeter wall 1912.

In this embodiment, stiffener-member 1800 further includes a stiffener-member face sheet 1914 formed onto top surface 1904 of stiffener-member core 1902 as a continuous structure 1916. Because stiffener-member core 1902 and stiffener-member face sheet 1912 of stiffener-member 1800 are formed as continuous structure 1916, discontinuities do not exist between top surface 1904 of stiffener-member core 1902 and stiffener-member face sheet 1914. For example, during an AM process used to form stiffener-member 1800, a first series of manufacturing steps are used to form stiffener-member core 1902, and a second series of the manufacturing steps are used to form stiffener-member face sheet 1914 on top surface 1904 of stiffener-member core 1902 to form continuous structure 1916. In one non-limiting example, SLS is used to selectively sinter multiple layers of a material (e.g., Nylon) together during the AM process to form both stiffener-member core 1902 and stiffener-member face sheet 1914 as continuous structure 1916.

As described previously, attachment mechanism 146 (e.g., an adhesive) is used to mechanically attach stiffener-member 1800 to base panel 102. In this embodiment, attachment mechanism 146 attaches bottom surface 1906 of stiffener-member core 1902 to base panel face sheet 106 of base panel 102. In some embodiments, attachment mechanism 146 comprises bonding bottom surface 1906 of stiffener-member core 1902 to base panel face sheet 106 using an adhesive.

Figure 20:
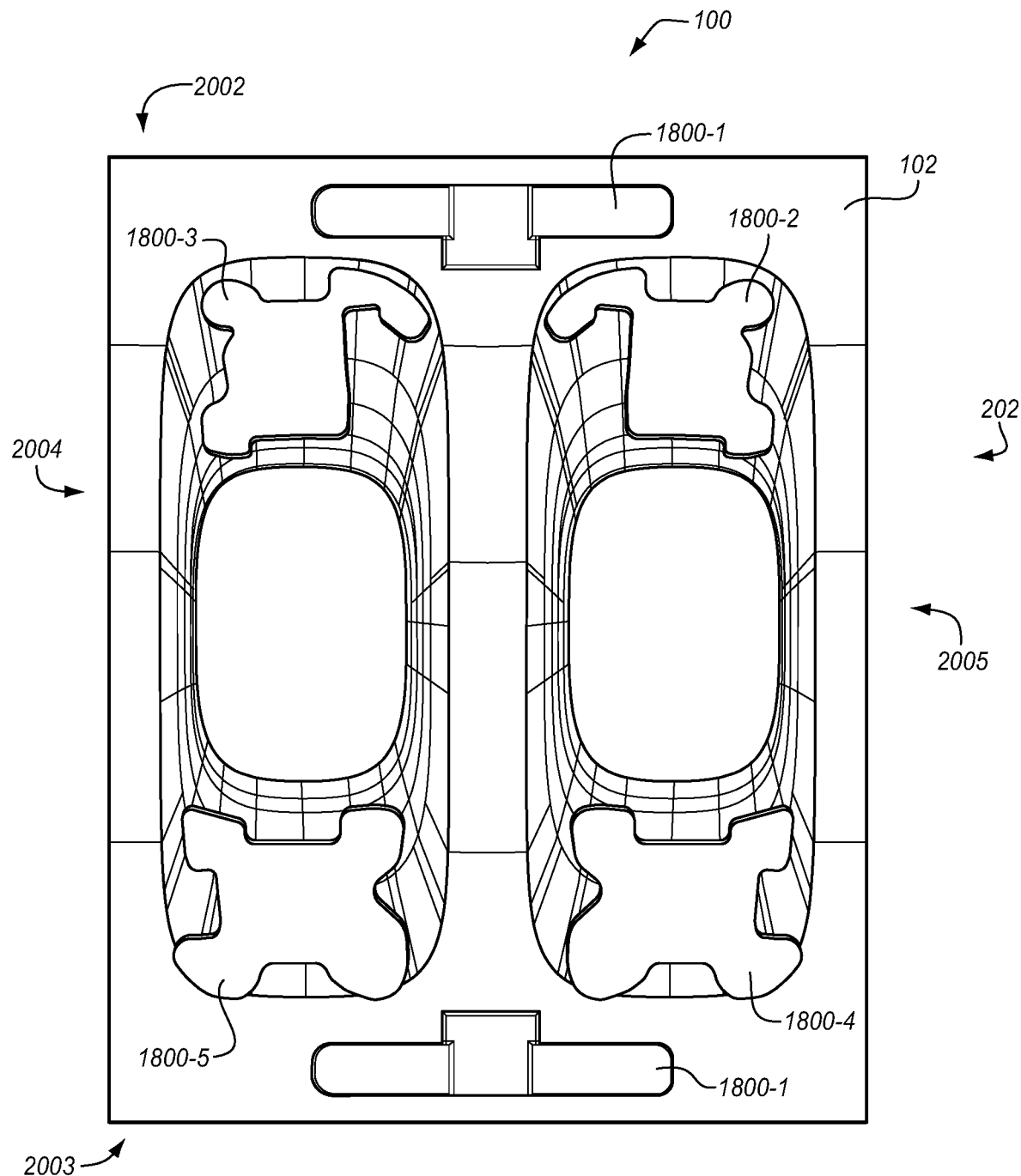
FIG. 20 depicts exemplary configurations of stiffener-members in an anti-resonant panel employed as an aircraft cabin panel in an illustrative embodiment.

FIG. 20 depicts exemplary configurations of stiffener-members 1800 in an anti-resonant panel 100 employed as aircraft cabin panel 202 in an illustrative embodiment. In this embodiment, stiffener-members 1800-1 are proximate to ends 2002-2003 of aircraft cabin panel 202, each including variable height features to enable stiffener-members 1800-1 to clear support beams (not shown). These variable height features will be discussed later. Further in this embodiment, stiffener-member 1800-2 and stiffener-member 1800-3 are proximate to end 2002 of aircraft cabin panel 202, with stiffener-member 1800-3 proximate to side 2004 of aircraft cabin panel 202 and stiffener-member 1800-2 proximate to side 2005 of aircraft cabin panel 202. Stiffener-member 1800-4 and stiffener-member 1800-5 are proximate to end 2003 of aircraft cabin panel 202, with stiffener-member 1800-5 proximate to side 2004 and stiffener-member 1800-4 proximate to side 2005.

Figure 21:
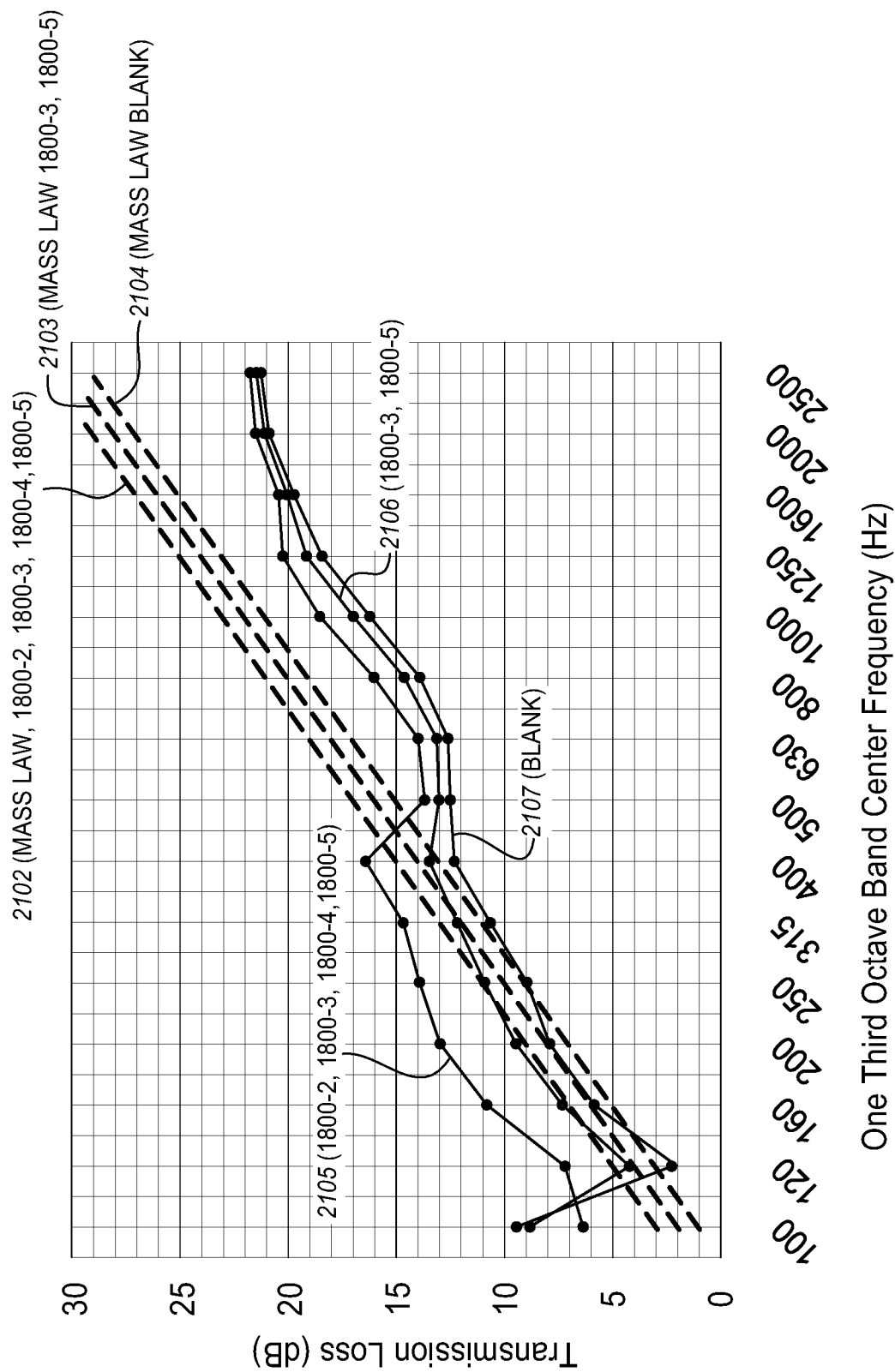
FIG. 21 illustrates a transmission loss graph of a mass-law prediction and experimentally measured results in an illustrative embodiment.

FIG. 21 illustrates a transmission loss graph of a mass-law prediction and experimentally measured results in an illustrative embodiment. The performance shown in FIG. 21 is merely representative and is relative to the noise that may be blocked. The performance shown in FIG. 21 is not intended to limit the present disclosure. FIG. 21 shows the transmission loss performance of an anti-resonant panel 100 employed as aircraft cabin panel 202, along with the mass-law prediction. Line 2104 represents the mass-law prediction when aircraft cabin panel 202 is blank. Line 2104 represents the mass-law prediction when aircraft cabin panel 202 includes stiffener-member 1800-3 and stiffener-member 1800-5. Line 2102 represents the mass-law prediction when aircraft cabin panel 202 includes stiffener-member 1800-2, stiffener-member 1800-3, stiffener-member 1800-4, and stiffener-member 1800-5.

Line 2107 represents the experimentally measured results when aircraft cabin panel 202 is blank, line 2106 represents the experimentally measured results when aircraft cabin panel 202 includes stiffener-member 1800-3 and stiffener-member 1800-5, and line 2105 represents the experimentally measured results when aircraft cabin panel 202 includes stiffener-member 1800-2, stiffener-member 1800-3, stiffener-member 1800-4, and stiffener-member 1800-5. As shown in FIG. 21, anti-resonant panel 100 employed as aircraft cabin panel 202 provides improved noise blocking, particularly at low frequencies, and a higher noise blocking than found with an equivalent mass density.

Figure 22:
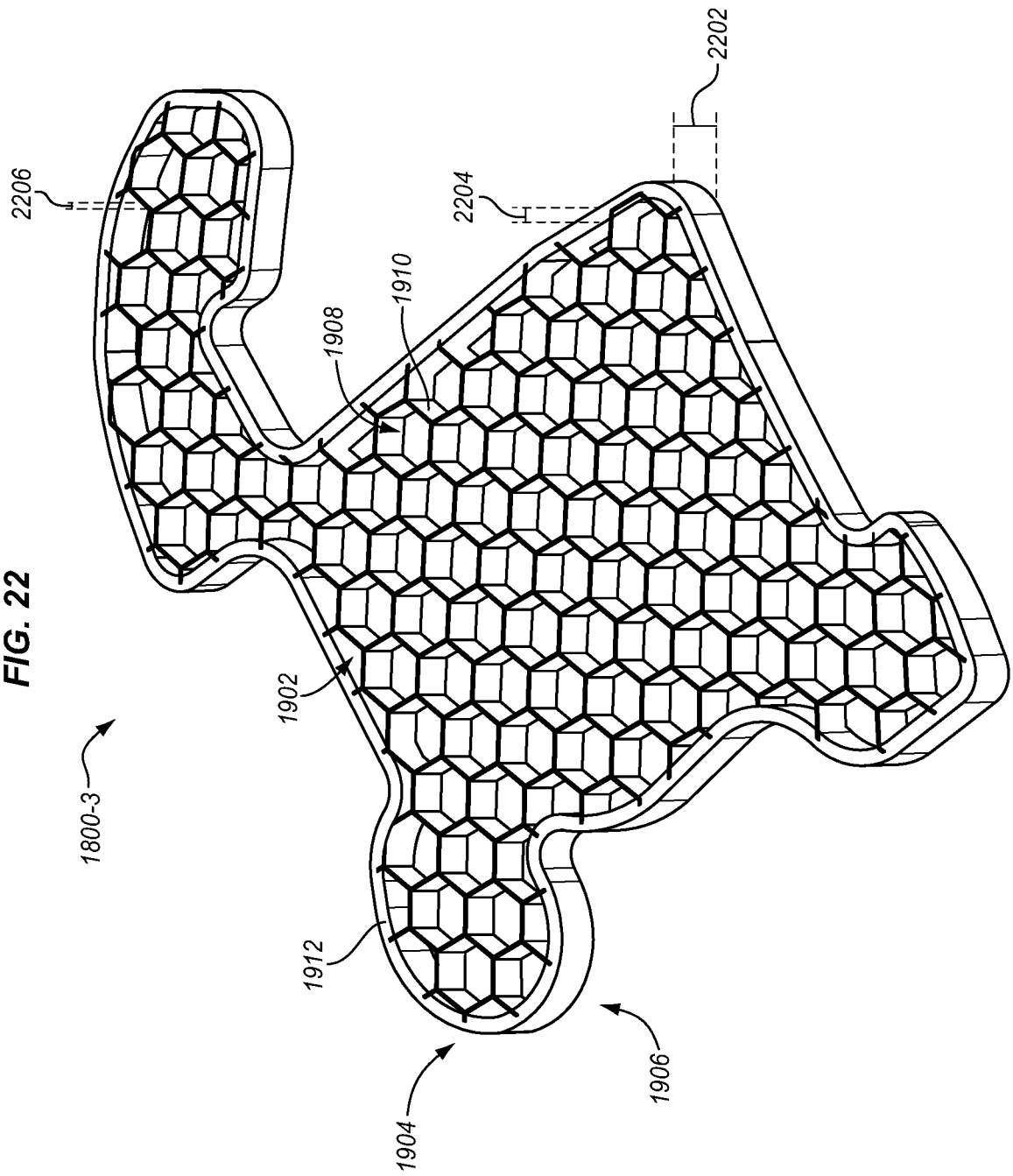
FIG. 22 is an isometric view of a stiffener-member in an illustrative embodiment.

FIG. 22 is an isometric view of stiffener-member 1800-3 in an illustrative embodiment. In this view, stiffener-member face sheet 1914 has been removed to reveal stiffener-member core 1902, which comprises a plurality of cells 1908 having walls 1910 that extend from top surface 1904 of stiffener-member core 1902 to bottom surface 1906 of stiffener-member core 1902. In this embodiment, cells 1908 are in the shape of a hexagon, although cells 1908 have other shapes in other embodiments.

In this embodiment, cells 1908 are surrounded by perimeter wall 1912. In some embodiments, stiffener-member core 1902 has a height 2202 between 0.5 inches and 1 inch, with a preferred height of 0.75 inches. In this embodiment, perimeter wall 1912 has a thickness 2204 of between 0.075 and 0.125 inches, with a preferred thickness of 0.1 inches. Further in this embodiment, walls 1910 of cells 1908 have a thickness 2206 between 0.1 and 0.2 inches, with a preferred thickness of 0.15 inches.

Figure 23:
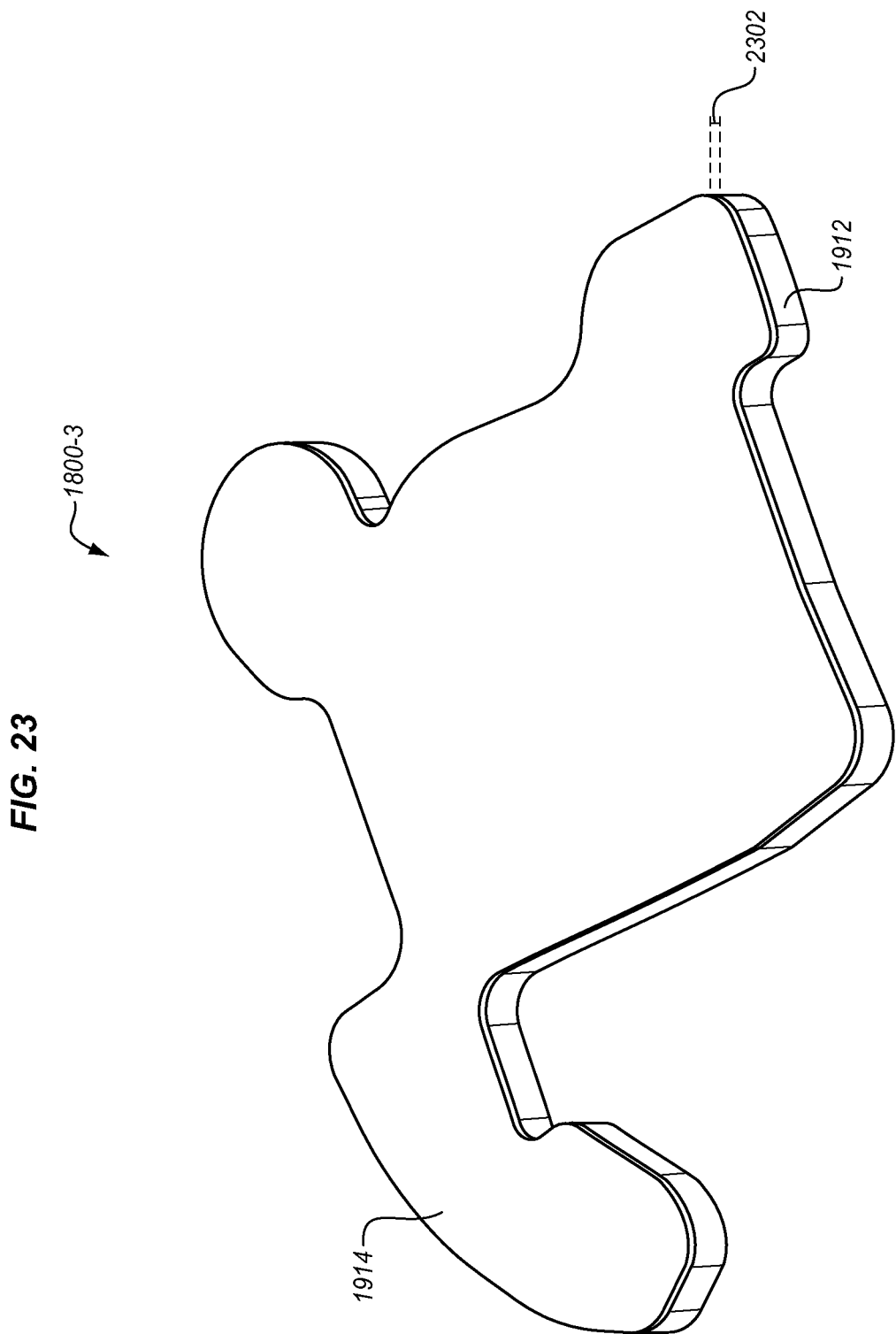
FIG. 23 is an isometric view of the stiffener-member of FIG. 22 in an illustrative embodiment.

FIG. 23 is an isometric view of stiffener-member 1800-3 in an illustrative embodiment. In this view, stiffener-member 1800-3 includes stiffener-member face sheet 1914, which obscures stiffener-member core 1902. In this embodiment, stiffener-member face sheet 1914 has a thickness 2302 between 0.15 inches and 0.25 inches, with a preferred thickness of 0.2 inches.

Figure 24:
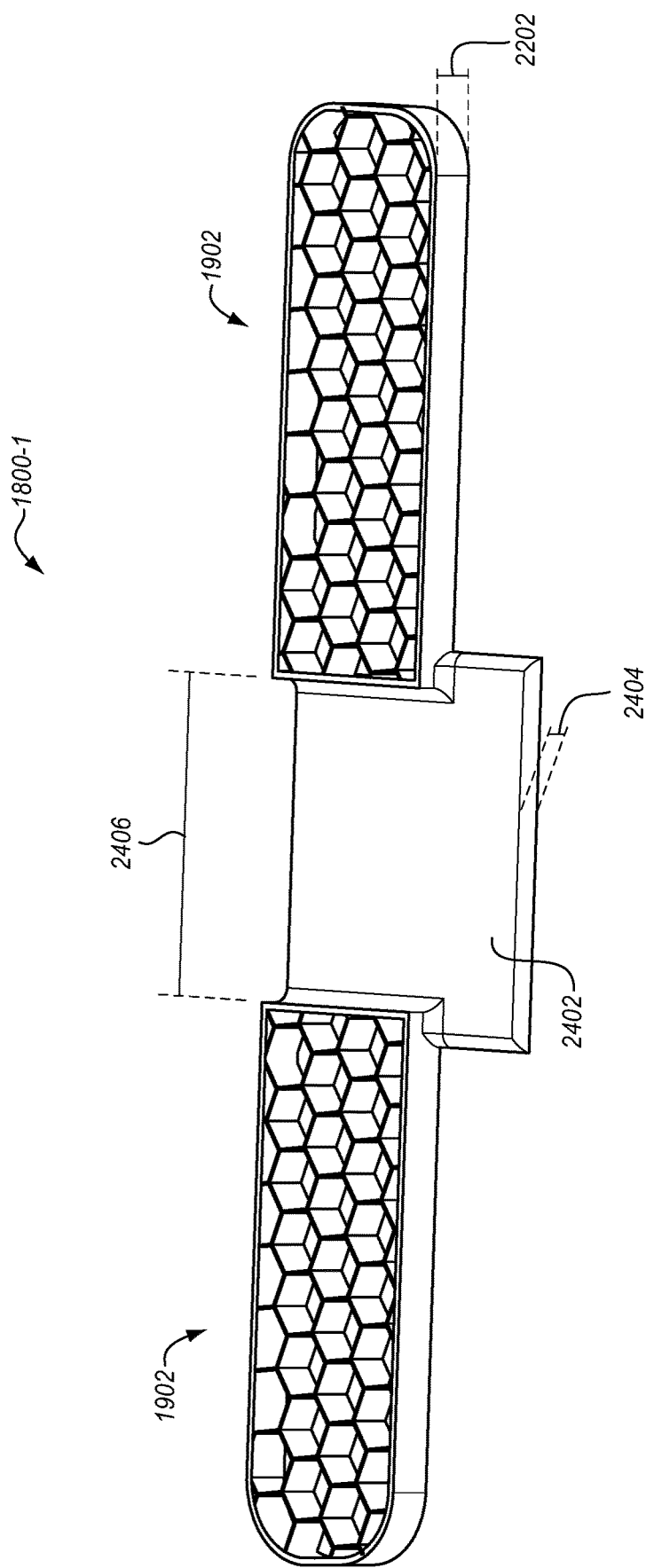
FIG. 24 is an isometric view of another stiffener-member in an illustrative embodiment.

In some embodiments, stiffener-members 1800 may have areas that include stiffener-member core 1902 along with areas that have a different construction. This is illustrated in FIG. 24, which is an isometric view of stiffener-member 1800-1 in accordance with some example embodiments described herein. In FIG. 24, stiffener-member 1800-1 includes a pad 2402, which provides a clearance between structural supports proximate to aircraft side panel 202 and stiffener-member 1800-1. In some embodiments, pad 2402 is a solid material (e.g., Nylon).

In this embodiment, pad 2402 has a height 2402 of between 0.15 inches and 0.25 inches, with a preferred height of 0.2 inches. Pad 2402 has a width 2206 that varies based on the dimensions of the structural supports that are proximate to aircraft side panel 202.

Figure 25:
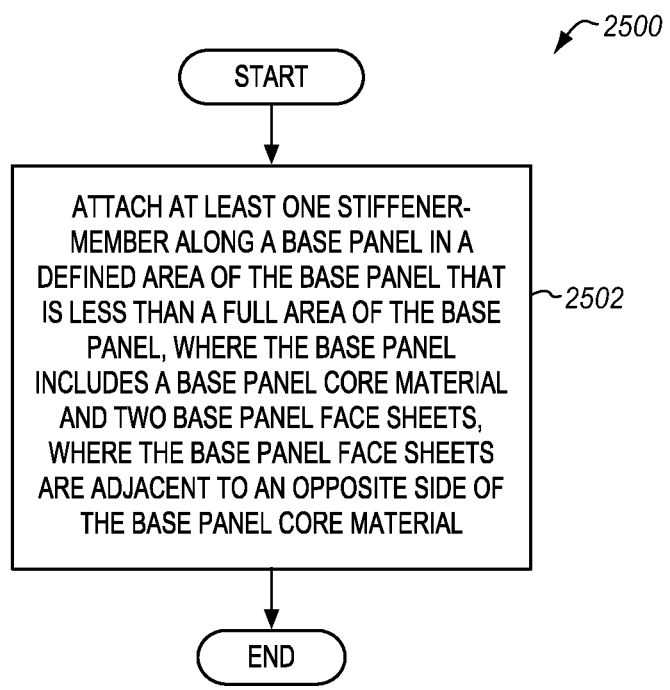
FIG. 25 is a flow chart of a method of making an anti-resonant panel in an illustrative embodiment.

FIG. 25 is a flow chart of a method 2500 of making an anti-resonant panel in an illustrative embodiment. Method 2500 will be described with respect to stiffener-member 1800 of FIG. 19, although method 2500 applies equally to other configurations of stiffener-member 1800.

Step 2502 of method 2500 comprises attaching at least one stiffener-member 1800 along base panel 102 in a defined area of base panel 102, where the defined area is less than a full area of base panel 102. To do so, bottom surface 1906 of stiffener-member core 1902 is attached to base panel face sheet 106 of base panel 102, using attachment mechanism 146.

Figure 26:
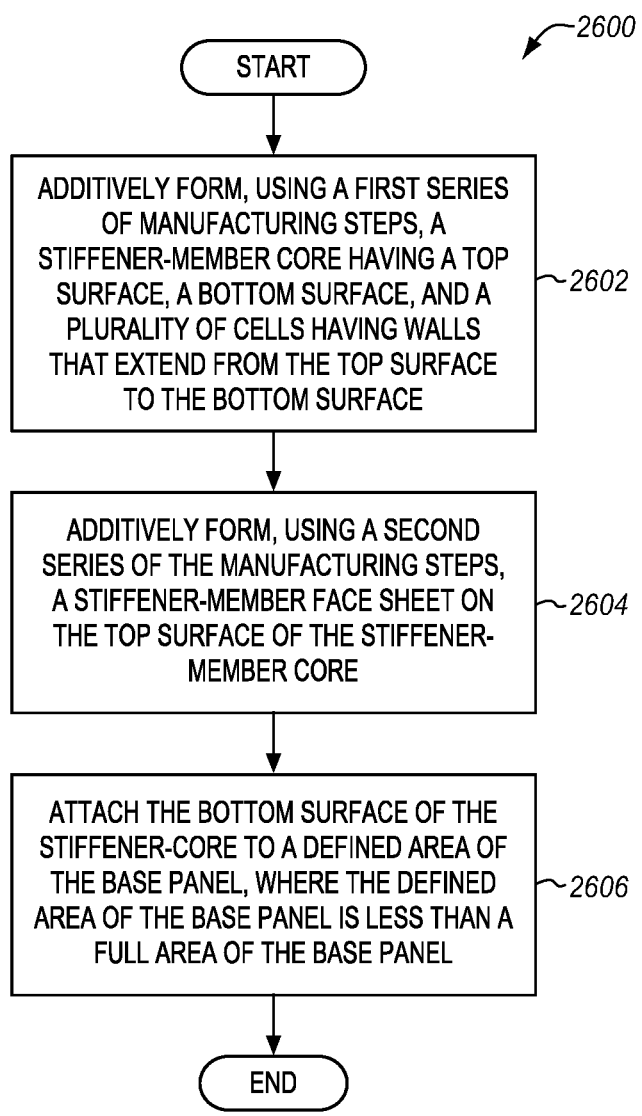
FIG. 26 is a flow chart of a method of making an anti-resonant panel in another illustrative embodiment.

FIG. 26 is a flow chart of a method 2600 of making an anti-resonant panel in another illustrative embodiment. Method 2600 will be described with respect to stiffener-member 1800 of FIG. 18, although method 2600 applies equally to other configurations of stiffener-member 1800. The steps of method 2600 are not all inclusive, and method 2600 may include other steps, not shown. Further, the steps may be performed in an alternate order.

Using an AM process comprising a first series of manufacturing steps (e.g., SLS), stiffener-member core 1902 (see FIG. 19) is formed having top surface 1904, bottom surface 1906, and cells 1908 having walls 1910 that extend from top surface 1904 to bottom surface 1906 (see step 2602). For instance, stiffener-member core 1902 may be built up layer-by-layer from bottom surface 1906 to top surface 1904, with walls 1910 of cells 1908 formed concurrently. In some embodiments, perimeter wall 1912 is also formed concurrently. See, for example, FIG. 22.

In response to forming stiffener-member 1902, the AM process continues through a second series of manufacturing steps to form stiffener-member face sheet 1914 on top surface 1904 of stiffener-member core 1902. For instance, stiffener-member face sheet 1914 may be built up layer-by-layer until a desired thickness is achieved for stiffener-member face sheet 1914 (e.g., thickness 2302 of stiffener-member 1800-3 of FIG. 23).

In response to forming stiffener-member face sheet 1914 on top surface 1904 of stiffener-member core 1902, bottom surface 1906 of stiffener-member core 1902 is attached to a defined area of base panel 102, where the defined area is less than a full area of base panel 102 (see step 2606).

The use of stiffener-members 1800 on base panel 102 provides anti-resonant performance to base panel 102, while adding negligible weight to base panel 102. Further, fabricating stiffener-members 1800 using an AM process enables a variety of shapes, dimensions, and materials to be quickly tested for their performance characteristics in providing anti-resonant capabilities to base panel 102.

The word "exemplary", when used herein, is intended to mean "serving as an example, instance, or illustration". Any implementation described herein as "exemplary" is not necessarily preferred or advantageous over other implementations.

As used in the specification and in the appended claims, the singular forms "a", "an", and "the" include plural referents unless the context clearly indicates otherwise. For example, reference to "a stiffener-member" includes a plurality of such stiffener-members, unless the context clearly indicates otherwise.

As used in the specification and in the appended claims, reference to "on" includes both embodiments in which a component is disposed directly on another component as well as embodiments in which one or more intervening layers or elements are disposed between the components.

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. An anti-resonate panel, comprising:
a base panel comprising a base panel core material and two base panel face sheets, each of the two base panel face sheets adjacent to an opposite side of the base panel core material; and
at least one stiffener-member positioned along the base panel in a defined area of the base panel, the defined area being less than a full area of the base panel,
wherein the at least one stiffener-member comprises a stiffener-member core having a top surface, a bottom surface in contact with the base panel, a plurality of cells having walls that extend from the top surface to the bottom surface, and a stiffener-member face sheet that is seamlessly integrated with the walls of the plurality of cells along the top surface.

2. The anti-resonant panel of claim 1, wherein:
the at least one stiffener-member is configured to provide anti-resonant performance to the base panel by adding stiffness to the defined area of the base panel at a low mass density.

3. The anti-resonant panel of claim 1, wherein:
the at least one stiffener-member comprises two or more stiffener-members, each positioned along the base panel in respective defined areas of the base panel.

4. The anti-resonant panel according to claim 1, wherein:
the stiffener-member core and the stiffener-member face sheet comprises Nylon.

5. The anti-resonant panel of claim 1, wherein:
the cells comprise hexagonal cells.

6. The anti-resonant panel of claim 1, wherein:
the stiffener-member core includes a perimeter wall extending from the top surface to the bottom surface that surrounds the plurality of cells and is seamlessly integrated with the walls of the cells that are in contact with the perimeter wall.

7. The anti-resonant panel of claim 1, wherein:
the anti-resonant panel is configured to reduce noise propagation through the anti-resonant panel at frequencies between 300 Hertz to 1000 Hertz.

8. The anti-resonant panel of claim 1, wherein:
the bottom surface of the at least one stiffener-member is bonded to the base panel utilizing an adhesive.

9. A method of making an anti-resonant panel having a base panel with a base panel core material and two base panel face sheets, each of the two base panel face sheets adjacent to an opposite side of the base panel core material, the method comprising:
attaching at least one stiffener-member along the base panel in a defined area of the base panel, the defined area less than a full area of the base panel, the at least one stiffener-member including a stiffener-member core having a top surface, a bottom surface in contact with the base panel, a plurality of cells having walls that extend from the top surface to the bottom surface, and a stiffener-member face sheet that is seamlessly integrated with the walls of the plurality of cells along the top surface.

10. The method of claim 9, wherein:
the at least one stiffener-member is configured to provide anti-resonant performance to the base panel by adding stiffness to the defined area of the base panel at a low mass density.

11. The method of claim 9, wherein attaching the at least one stiffener-member comprises:
attaching two or more stiffener-members, each positioned along the base panel in respective defined areas of the base panel.

12. The method of claim 9, wherein:
the cells comprise hexagonal cells.

13. The method of claim 9, wherein:
the stiffener-member core includes a perimeter wall extending from the top surface to the bottom surface that surrounds the plurality of cells and is seamlessly integrated with the walls of the cells that are in contact with the perimeter wall.

14. The method of claim 9, wherein:
the anti-resonant panel is configured to reduce noise propagation through the anti-resonant panel at frequencies between 300 Hertz to 1000 Hertz.

15. The method of claim 9, wherein attaching the at least one stiffener-member comprises:
bonding the bottom surface of the at least one stiffener-member to the base panel utilizing an adhesive.

16. A method of making an anti-resonant panel having a base panel with a base panel core material and two base panel face sheets, each of the two base panel face sheets adjacent to an opposite side of the base panel core material, the method comprising:
additively forming, using a first series of manufacturing steps, a stiffener-member core having a top surface, a bottom surface, and a plurality of cells having walls that extend from the top surface to the bottom surface;
additively forming, using a second series of the manufacturing steps, a stiffener-member face sheet on the top surface of the stiffener-member core; and
attaching the bottom surface of the stiffener-member core to a defined area of the base panel, wherein the defined area of the base panel is less than a full area of the base panel.

17. The method of claim 16, wherein:
the manufacturing steps comprise Selective Laser Sintering (SLS).

18. The method of claim 17, wherein:
the stiffener-member core and the stiffener-member face sheet comprise Nylon.

19. The method of claim 16, wherein:
the cells comprise hexagonal cells.

20. The method of claim 16, further comprising:
additively forming, using the first series of manufacturing steps, a perimeter wall extending from the top surface to the bottom surface that surrounds the plurality of cells and is seamlessly integrated with the walls of the cells that are in contact with the perimeter wall.

* * * * *